(12) United States Patent
Enami et al.

(10) Patent No.: US 8,400,647 B2
(45) Date of Patent: Mar. 19, 2013

(54) IMAGE FORMING APPARATUS, OPERATION-SCREEN UPDATING METHOD, AND COMPUTER PROGRAM PRODUCT

(75) Inventors: Eiji Enami, Kanagawa (JP); Junji Matsuzawa, Kanagawa (JP); Masayuki Yabuuchi, Kanagawa (JP); Kazuya Iwasaki, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 517 days.

(21) Appl. No.: 12/533,575

(22) Filed: Jul. 31, 2009

(65) Prior Publication Data

US 2010/0033748 A1  Feb. 11, 2010

(30) Foreign Application Priority Data

Aug. 7, 2008 (JP) ................. 2008-204625
Sep. 10, 2008 (JP) ................. 2008-232381
Jun. 23, 2009 (JP) ................. 2009-148901

(51) Int. Cl.
*G06F 3/12* (2006.01)
(52) U.S. Cl. ...................... 358/1.13; 345/173
(58) Field of Classification Search ............... 358/1.13, 358/1.15; 345/762, 1, 33, 173
See application file for complete search history.

(56) References Cited

U.S. PATENT DOCUMENTS 5,844,547 A * 12/1998 Minakuchi et al. ........... 345/173
2002/0030838 A1* 3/2002 Toyama et al. ............... 358/1.13
2002/0163540 A1* 11/2002 Kishimoto .................... 345/762
2007/0057961 A1 3/2007 Enami et al.
2008/0266598 A1* 10/2008 Ozaki ......................... 358/1.15

FOREIGN PATENT DOCUMENTS

| JP | 2-2580 | 1/1990 |
| JP | 2000-99238 | 4/2000 |
| JP | 2001-75689 | 3/2001 |
| JP | 2002-14800 | 1/2002 |
| JP | 2002-41202 | 2/2002 |
| JP | 3464418 | 8/2003 |
| JP | 3859910 | 9/2006 |
| JP | 3859911 | 9/2006 |
| JP | 2007-34486 | 2/2007 |
| JP | 2007-279438 | 10/2007 |
| JP | 2007-282198 | 10/2007 |

* cited by examiner

*Primary Examiner* — Kimberly A Williams
*Assistant Examiner* — Moustapha Diaby
(74) *Attorney, Agent, or Firm* — Oblon, Spivak, McClelland, Maier & Neustadt, L.L.P.

(57) ABSTRACT

A determination unit detects a change of a configuration of an image forming apparatus and determines whether an operation screen needs to be updated based on a content of detected change. When it is determined that an update of the operation screen is needed, a screen-configuration-data acquisition unit acquires screen configuration data corresponding to an operation screen after the update from a storage unit. A generation unit generates operation screen data that is screen configuration data for an updated operation screen based on received screen configuration data and configuration information related to the display unit.

17 Claims, 15 Drawing Sheets

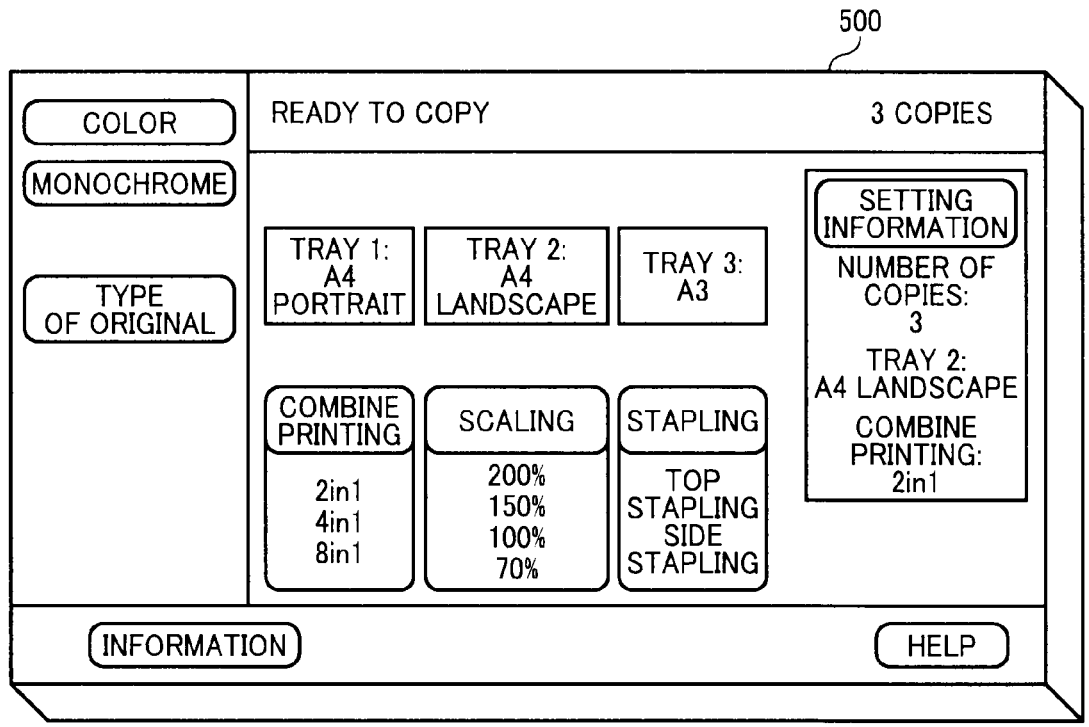

IMAGE FORMING APPARATUS, OPERATION-SCREEN UPDATING METHOD, AND COMPUTER PROGRAM PRODUCT

CROSS-REFERENCE TO RELATED APPLICATIONS

The present application claims priority to and incorporates by reference the entire contents of Japanese Patent Application No. 2008-204625 filed in Japan on Aug. 7, 2008, Japanese Patent Application No. 2008-232381 filed in Japan on Sep. 10, 2008, and Japanese Patent Application No. 2009-148901 filed in Japan on Jun. 23, 2009.

BACKGROUND OF THE INVENTION

1. Field of the Invention

The present invention relates to a technology for generating an operation screen according to device specifications of a display device.

2. Description of the Related Art

In association with an increase in functions of image forming apparatuses, multifunctional display devices such as operation units provided in the image forming apparatuses have also been developed. For example, the image forming apparatus that has functions of editing and processing received image data includes a display device that has a function of checking a processed image. Large-size full-color display devices are widely used in terms of improved operability, and display devices designed for "universal design" are also widely used in terms of user assistance.

Thus, it is desired that the display device in the image forming apparatus provides not only a notification function of device information but also a user interface (UI) function depending on intended uses of users. Developed as an image forming apparatus including a display device provided with the user interface function is an image forming apparatus configured to include a control unit and a display unit and to place a display panel in the display unit side. (e.g., Japanese Patent Application Laid-open Nos. 2007-282198 and 2007-34486, and Japanese Patent No. 3464418).

Japanese Patent Application Laid-open No. 2007-282198 proposes an image forming apparatus capable of performing various processes such as image editing and processing on received image data in association with improved image processing capability provided by the image forming apparatus and capable of checking the processed image data on the display device.

Japanese Patent No. 3464418 proposes an image forming apparatus capable of remote-controlling an output of a display screen through a display control device by connecting input and output units that implement a plurality of input/output functions to the display control device as a single unit that implements a display control function.

An image forming apparatus described in Japanese Patent Application Laid-open No. 2007-34486 tabulates and manages image data for an operation screen that is displayed on a display panel by a central processing unit (CPU) provided in the display unit side, and combines the tabulated and managed image data with each other, to generate the operation screen. Thus, operation screens of various sizes can be generated in the display unit side, so that a flexible configuration without being affected by a screen size of the display panel can be achieved.

Japanese Patent Application Laid-open No. 2007-279438 proposes an image forming apparatus as an information processing device that is applicable to the image forming apparatus. The image forming apparatus includes a controller unit that stores therein font data used to generate an operation screen and a display unit with a display panel that acquires desired font data from the controller unit upon switching of a language on the operation screen. Thus, it is possible to obtain the image forming apparatus capable of handling a display of a plurality of languages while suppressing an increase in the capacity of memory in the display unit.

However, the image forming apparatuses described in Japanese Patent Application Laid-open No. 2007-282198 and Japanese Patent No. 3464418 have some problems that if the display device is changed to any device with a larger screen size than the current screen size, the size of the display screen remains as the current one, so that data is not displayed with an appropriate size.

The image forming apparatus described in Japanese Patent Application Laid-open No. 2007-34486 cannot generate and display any operation screen with images other than combinations of basic images previously tabulated and stored in a storage area. Therefore, to enable generation of operation screens with various display contents, the number of basic images to be stored need to be increased, and this causes the storage area to be narrowed.

In the image forming apparatus described in Japanese Patent Application Laid-open No. 2007-279438, when the number of languages to be handled is increased, the font data needs to be prepared according to the number of languages, and this causes the storage area in the controller unit to be narrowed.

SUMMARY OF THE INVENTION

It is an object of the present invention to at least partially solve the problems in the conventional technology.

According to one aspect of the present invention, there is provided an image forming apparatus including a controller unit that executes various processes to form an image; a display unit that includes a display and displays an operation screen for receiving an operation instruction of the processes from a user on the display; and a generation unit that generates the operation screen. The controller unit includes a storage unit that stores therein screen configuration data including a display element that forms the operation screen and position information for the display element on the operation screen, a determination unit that detects a change of a configuration of the image forming apparatus and determines whether the operation screen needs to be updated based on a content of detected change, a screen-configuration-data acquisition unit that acquires, when it is determined that an update of the operation screen is needed, screen configuration data corresponding to an operation screen after the update from the storage unit, and a first communication unit that transmits acquired screen configuration data to the display unit. The display unit includes a display controller that displays a first operation screen that is an operation screen before the update on the display and a second communication unit that receives the screen configuration data from the first communication unit. The generation unit generates second operation screen data that is screen configuration data for a second operation screen based on received screen configuration data and configuration information related to the display unit. The display controller updates the first operation screen to the second operation screen based on the second operation screen data.

Furthermore, according to another aspect of the present invention, there is provided a method of updating an operation screen in an image forming apparatus that includes a controller unit that executes various processes to form an image, a display unit that includes a display and displays an operation screen for receiving an operation instruction of the processes from a user on the display, a generation unit that generates the operation screen, and a storage unit that stores therein screen configuration data including a display element that forms the operation screen and position information for the display element on the operation screen. The method includes determining including a determination unit of the controller unit detecting a change of a configuration of the image forming apparatus and determining whether the operation screen needs to be updated based on a content of detected change; acquiring including a screen-configuration-data acquisition unit of the controller unit acquiring, when it is determined that an update of the operation screen is needed, screen configuration data corresponding to an operation screen after the update from the storage unit; first communicating including a first communication unit of the controller unit transmitting acquired screen configuration data to the display unit; display controlling including a display controller of the display unit displaying a first operation screen that is an operation screen before the update on the display; second communicating including a second communication unit of the display unit receiving the screen configuration data from the first communication unit; generating including the generation unit generating second operation screen data that is screen configuration data for a second operation screen based on received screen configuration data and configuration information related to the display unit; and updating including the display controller updating the first operation screen to the second operation screen based on the second operation screen data.

Moreover, according to still another aspect of the present invention, there is provided a computer program product including a computer-usable medium having computer-readable program codes embodied in the medium for implementing a method of updating an operation screen in an image forming apparatus that includes a controller unit that executes various processes to form an image, a display unit that includes a display and displays an operation screen for receiving an operation instruction of the processes from a user on the display, a generation unit that generates the operation screen, and a storage unit that stores therein screen configuration data including a display element that forms the operation screen and position information for the display element on the operation screen. The program codes when executed cause a computer to execute determining including a determination unit of the controller unit detecting a change of a configuration of the image forming apparatus and determining whether the operation screen needs to be updated based on a content of detected change; acquiring including a screen-configuration-data acquisition unit of the controller unit acquiring, when it is determined that an update of the operation screen is needed, screen configuration data corresponding to an operation screen after the update from the storage unit; first communicating including a first communication unit of the controller unit transmitting acquired screen configuration data to the display unit; display controlling including a display controller of the display unit displaying a first operation screen that is an operation screen before the update on the display; second communicating including a second communication unit of the display unit receiving the screen configuration data from the first communication unit; generating including the generation unit generating second operation screen data that is screen configuration data for a second operation screen based on received screen configuration data and configuration information related to the display unit; and updating including the display controller updating the first operation screen to the second operation screen based on the second operation screen data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram of an example of a copy screen;

FIG. 4 is a diagram of an example of screen configuration data for the copy screen;

DETAILED DESCRIPTION OF THE PREFERRED EMBODIMENTS

Exemplary embodiments of an image forming apparatus, an operation-screen updating method, and a computer program according to the present invention are explained in detail below with reference to the accompanying drawings.

Figure 1:
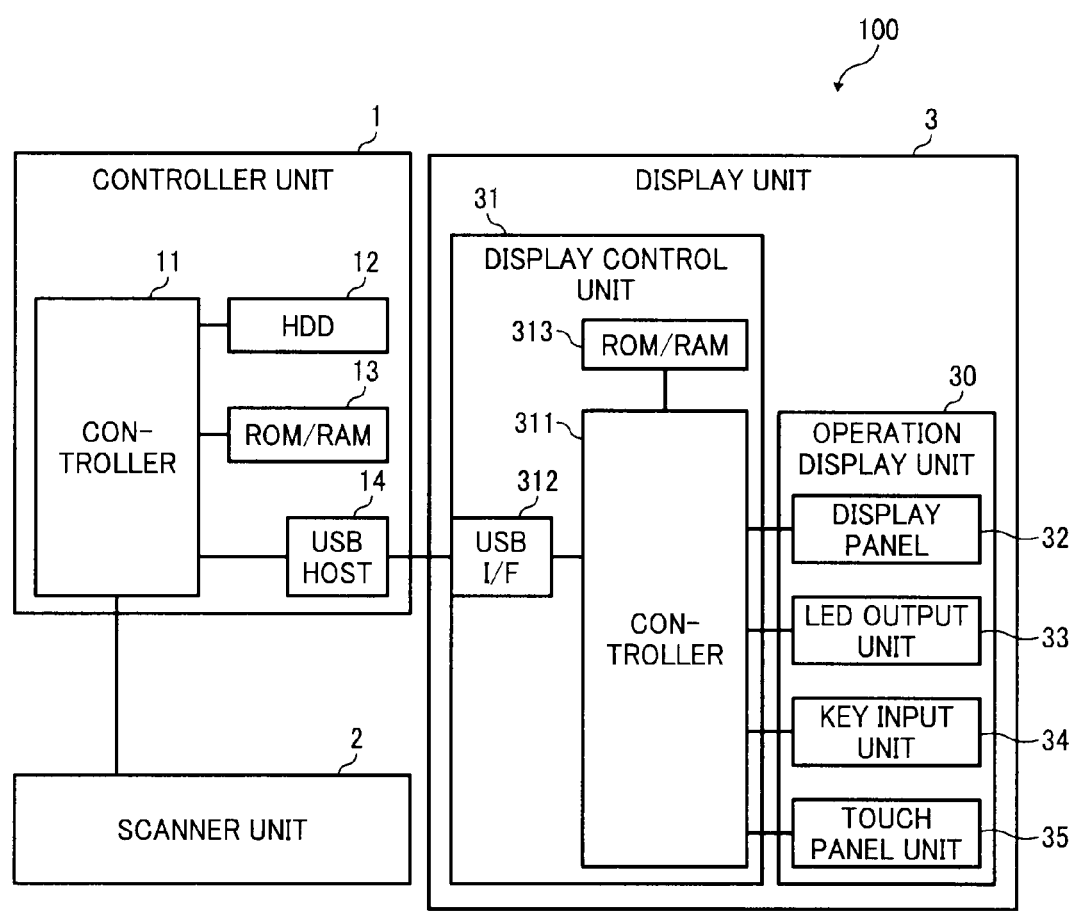
FIG. 1 is a diagram of a hardware configuration of an image forming apparatus according to a first embodiment of the present invention.

FIG. 1 is a diagram of a hardware configuration of an image forming apparatus 100 according to a first embodiment of the present invention. The image forming apparatus 100 includes a controller unit 1 and a display unit 3. It is noted that FIG. 1 shows only components required for implementing characteristic operations in the image forming apparatus 100 and components related to the components. Therefore, description of components required for implementing ordinary processes including an image forming process is omitted.

As shown in FIG. 1, the controller unit 1 includes a controller 11, a hard disk drive (HDD) 12, read only memory (ROM)/random access memory (RAM) 13, and a communication interface (universal serial bus (USB) HOST) 14. Specifically, the controller 11 controls internal data management and operational state management for the image forming apparatus 100, and controls the units of the controller unit 1. The HDD 12 stores therein display elements and character fonts for an operation screen, the ROM/RAM 13 stores therein programs and work data, and the USB HOST 14 transmits/receives various types of information to/from the display unit 3.

The display unit 3 includes a display control unit 31 that generates data for various operation screens displayed to the outside (user), and an operation display unit 30 that receives an operation from the user and displays thereon various screens.

The operation display unit 30 includes a display panel 32 that reflects operation screen data generated by the display control unit 31, a light-emitting diode (LED) output unit 33 used to inform the user of operational states of devices, a key input unit 34 and a touch panel unit 35 that receive an execution instruction of an operation from the user.

The display control unit 31 includes a controller 311 that controls units of the display unit 3, a communication interface (USB I/F) 312 that transmits/receives various types of information to/from the controller unit 1, and ROM/RAM 313 that stores therein programs and work data. The controller 311 executes an application to manage operation screens so as to implement a display controller (not shown) that controls the display panel 32 and an input-output controller (not shown) that controls various input and output units (LED output unit 33, key input unit 34, and touch panel unit 35). Moreover, the controller unit 1 and the display unit 3 perform transmission/reception of various information through USB communication.

Figure 2:
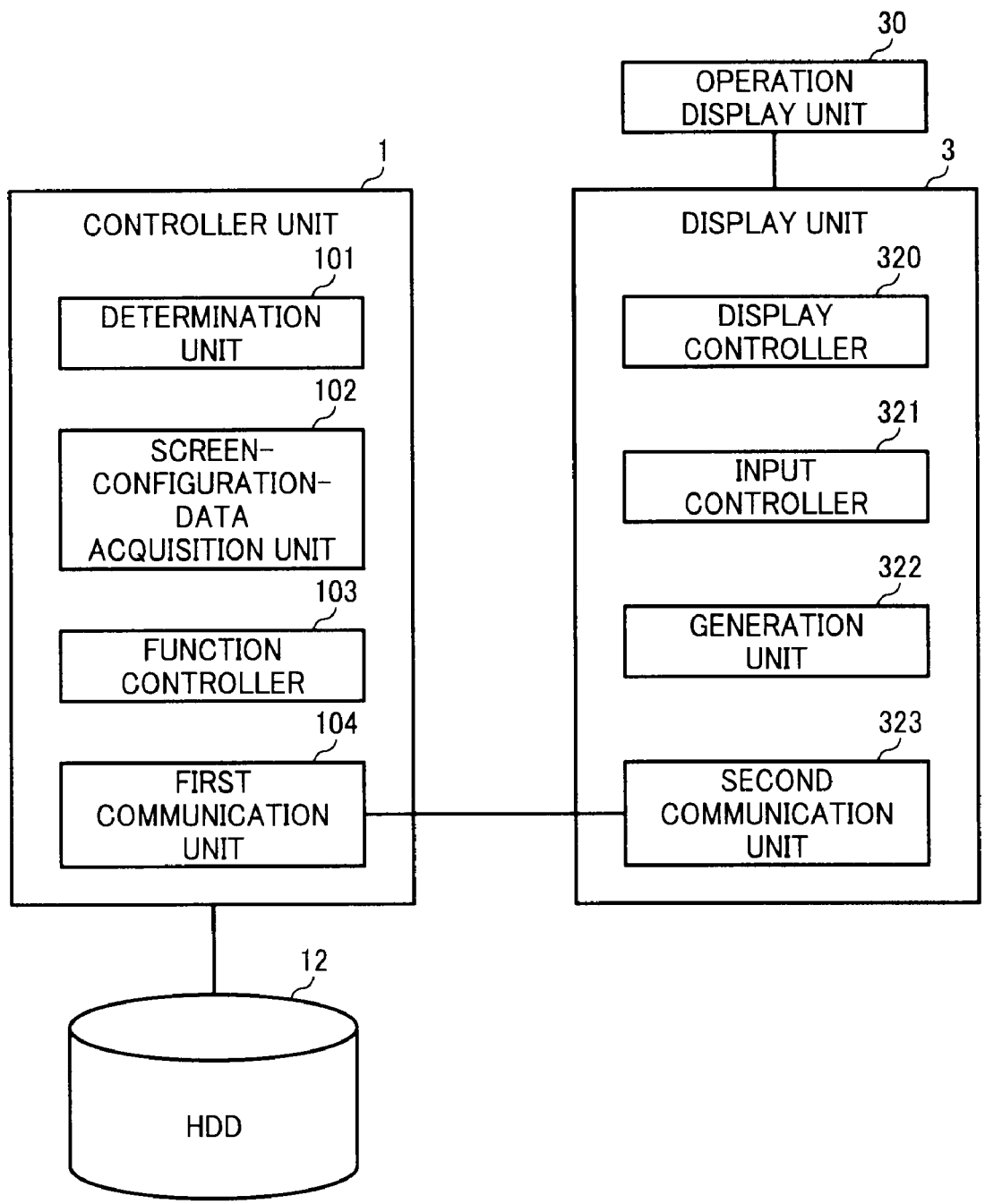
FIG. 2 is a block diagram of a functional configuration of a controller in a controller unit and of a controller in a display unit in FIG. 1.

Next, configurations and functions of the units provided in the controller 11 of the controller unit 1 and in the controller 311 of the display unit 3 are explained below. FIG. 2 is a block diagram of a functional configuration of the controller 11 of the controller unit 1 and the controller 311 of the display unit 3.

First, the controller 11 includes a determination unit 101, a screen-configuration-data acquisition unit 102, a function controller 103, and a first communication unit 104, and is connected to the HDD 12.

The HDD 12 stores therein the screen configuration data for an operation screen displayed on the operation display unit 30 of the display unit 3. Here, the operation screen can be a copy screen that displays thereon items capable of receiving an execution instruction of a copy operation (function), for example, when it is waited for the execution instruction of the copy operation from the user, and can be a notification screen that notifies the user of a status of an operation when the operation is in execution.

FIG. 3 is a diagram of an example of a copy screen 500. The copy screen 500 is formed with various icons. Displayed on the copy screen 500 are icons used to receive an input such as a selection item for a color (color and monochrome), a selection item for an original type such as text and photograph, selection items for paper size and orientation, and items for specifying combine printing, scaling, and stapling. Moreover, setting information for displaying a set item received through user input is displayed thereon. In addition, icons for receiving a selection of an information function for calling expla-nation for each function and a help function for guiding an input operation are also displayed thereon.

The screen configuration data mentioned here represents data including all display elements that form an operation screen displayed on the display panel 32 and position information indicating each positional relationship between the display elements on the operation screen.

The display element mentioned here represents image data such as an icon displayed on the display panel 32 when an execution operation is selected (icon for selecting an execution operation) and an icon displayed thereon to notify an operational state. However, the screen configuration data does not include character font data.

The display element is sometimes related to a particular operational state. For example, an icon for selecting a start of a copy operation is related to the copy operation, and an icon for selecting cancel of an operation in execution is related to a cancel operation. The HDD 12 stores therein these operational states associated with the display elements, respectively.

It is noted that a display element used to only notify the user of a devise status such as a display element for notifying a remaining amount of toner is not related to any one of the operations.

The position information mentioned here represents, for example, coordinate information or information for coordinates (display position) on a basic display panel assuming that any display element is displayed on the basic display panel of a predetermined size (resolution).

For example, the HDD 12 stores therein screen configuration data for all operation screens displayed according to following respective operational states, such as screen configuration data for an operation screen displayed when the power supply of the device is turned on and the device is in standby for receiving an operation input by the user, screen configuration data for an operation screen displayed when a scanner unit 2 is scanning an original, screen configuration data for a copy screen that receives an input of the number of copies, scaling, or any other item shown in FIG. 3, and screen configuration data for an operation screen displayed when an operation error occurs. These screen configuration data are previously generated and are written to the HDD 12 at the time of factory shipment or the like.

FIG. 4 is a diagram of an example of screen configuration data 600 for the copy screen 500. The screen configuration data 600 includes display elements that form the copy screen 500 and position information for the display elements. Shown as the display element are "icon name" classified for each function and "display text" displayed on each icon. Indicated as the position information is area information indicating allocation of positions where icons are arranged on the copy screen 500, or indicating coordinates of the positions. For example, in a first line of the screen configuration data 600, display text "Color" and position information "Area A: X=20, Y=30" are associated with an icon name "Button 1". In FIG. 4, although the example of screen configuration data is shown as the form of table for convenience in explanation, the example may be shown as data described in a markup language such as Extensible Markup Language (XML). By implementing the screen configuration data, the operation screen with the content registered in the screen configuration data is displayed on the display panel.

Referring back to FIG. 2, the determination unit 101 always monitors a change in the operational state of the image forming apparatus 100, and determines that the operation screen needs to be updated when detecting the change in the operational state. The change in the operational state mentioned here includes open/close of an external cover (door, etc.) provided in the image forming apparatus 100, toner shortage, and an error. The determination unit 101 transmits information for the detected operational state to the screen-configuration-data acquisition unit 102. The determination unit 101 also transmits an update instruction to the display unit 3 to update the operation screen of the display panel 32.

The determination unit 101 further transmits device information as necessary, together with the transmission of the update instruction to the display unit 3, such as information for a remaining quantity of paper in a paper feed tray, information for a remaining amount of toner, information for connection of peripheral devices, and information for a status of the device requiring a display on the display panel 32.

When receiving the operational state from the determination unit 101, the screen-configuration-data acquisition unit 102 acquires the screen configuration data associated with the received operational state from the HDD 12. For example, when receiving a message that says "toner shortage" of the image forming apparatus 100 as the operational state, then, the screen-configuration-data acquisition unit 102 acquires the screen configuration data associated with the operational state "toner shortage" therefrom.

The function controller 103 controls the whole of the image forming apparatus 100. For example, the function controller 103 performs various imaging processes such as a scaling process of an original scanned from the scanner unit 2 and its output.

The first communication unit 104 transmits the screen configuration data acquired by the screen-configuration-data acquisition unit 102, the device information, and the update instruction to the display unit 3 through the USB HOST 14. The first communication unit 104 also receives information, from the display unit 3, input by the user through the operation display unit 30.

As shown in FIG. 2, the controller 311 of the display unit 3 includes a display controller 320, an input controller 321, a generation unit 322, and a second communication unit 323, and also includes the operation display unit 30.

The second communication unit 323 receives the screen configuration data, the device information, and the update instruction from the controller unit 1 through the USB I/F 312. The second communication unit 323 also transmits information input by the user through the operation display unit 30 to the controller unit 1.

The generation unit 322 generates second operation screen data which is screen configuration data for a second operation screen corresponding to the operation display unit 30 based on the received screen configuration data and device information, and transmits the generated second operation screen data to the display controller 320.

The display controller 320 displays an operation screen on the operation display unit 30. Here, an operation screen before update is called a first operation screen and an operation screen after update is called the second operation screen. The display controller 320 receives the second operation screen from the generation unit 322 and implements the second operation screen data, to update the first operation screen to the second operation screen.

The input controller 321 receives various inputs from the user through pressing of the icons on the operation screen displayed on the operation display unit 30.

Figure 5:
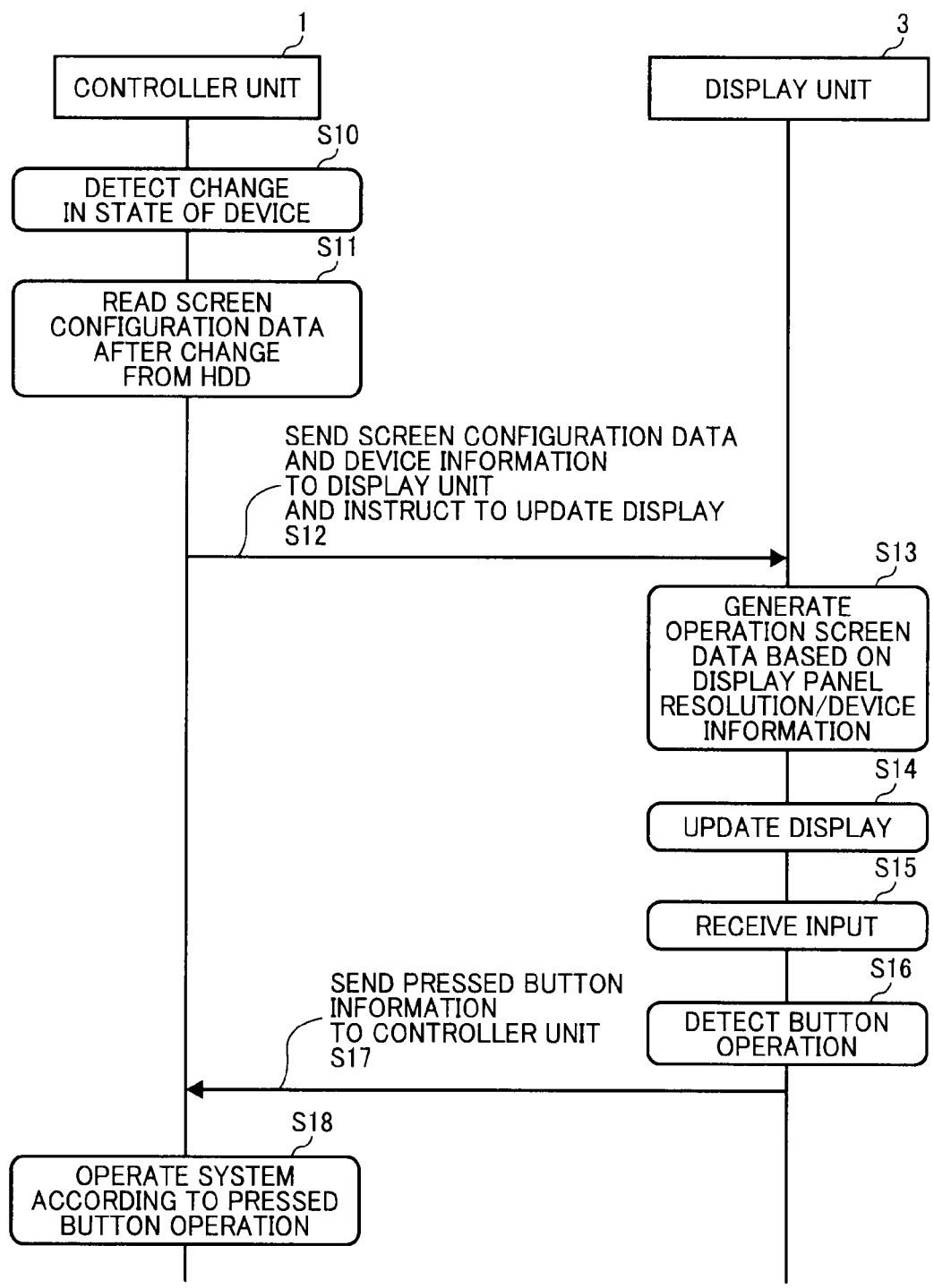
FIG. 5 is a sequence diagram of a procedure for an operation-screen updating process.

Next, a procedure for an operation-screen updating process performed by the controller unit 1 and the display unit 3 is explained below. FIG. 5 is a sequence diagram of the procedure for the operation-screen updating process.

In the controller unit 1, the determination unit 101 detects a change in state of the device (Step S10). For example, the determination unit 101 detects "open/close" of the door provided in the image forming apparatus 100, "toner shortage, and an operation instruction according to an input received by the input controller 321.

When detecting the change in state of the device, the determination unit 101 reads the screen configuration data corresponding to the state of the device after being changed from the HDD 12 (Step S11). For example, when detecting the "open/close" of the door, the determination unit 101 acquires the screen configuration data indicating a message prompting the user to close the door from the HDD 12, acquires the screen configuration data indicating a message "supply of toner" therefrom when detecting "toner shortage", and acquires the screen configuration data for an operation screen that displays icons indicating scaling types therefrom when detecting reception of a scaling instruction.

The determination unit 101 issues an update instruction to the display unit 3 to update the screen configuration data and the operation screen through the first communication unit 104 (Step S12). The determination unit 101 also transmits device information thereto as necessary.

The display unit 3 receives the screen configuration data and the update instruction from the controller unit 1 through the second communication unit 323, and the generation unit 322 generates the screen configuration data based on the resolution of the display panel 32 or the device information of the display unit 3 (Step S13). The resolution of the display panel 32 and the device information of the display unit 3 are previously stored in the ROM/RAM 13, and the generation unit 322 acquires some of them from the ROM/RAM 13.

Here, if there are similarity relations between a basic display panel, which is the display panel used when the screen configuration data stored in the HDD 12 is generated, and the display panel 32 as a target to be updated, then the process of converting the screen configuration data to generate operation screen data corresponds to an enlargement/reduction process of the operation screen displayed using the screen configuration data (hereinafter, "reference operation screen").

For example, when the basic display panel is larger than the display panel 32 ("size of basic display panel">"size of display panel 32"), the generation unit 322 generates operation screen data for the display panel 32 with a reduced reference operation screen. When the basic display panel is smaller than the display panel 32 ("size of basic display panel"<"size of display panel 32"), the generation unit 322 generates operation screen data for the display panel 32 with an enlarged reference operation screen. When the basic display panel and the display panel 32 are equal to each other in size, the display controller 320 uses the screen configuration data received from the controller unit 1 without any change, to generate the operation screen data. It is noted that the generation unit 322 previously stores therein size information for the basic display panel.

Meanwhile, if there are no similarity relations between the basic display panel and the display panel 32, then the generation unit 322 generates operation screen data by individually converting a display element and coordinate information included in the screen configuration data. For example, when a size of the basic display panel is 100×150 pixels and a size of the display panel 32 is 200×250 pixels, by converting the coordinate information (20, 30), a first element is converted to 20×200/100=40 and a second element is converted to 30×250/150=50. Namely, by executing the conversion process under the conditions, (40, 50) is obtained as coordinate information after the conversion. The same goes for the display element (image data), and thus, the conversion (enlargement/reduction) is performed based on the size of the basic display panel and the size of the display panel 32.

The display controller 320 receives the generated operation screen data from the generation unit 322, and updates the first operation screen displayed on the display panel 32 to the second operation screen that reflects the received operation screen data (Step S14).

The input controller 321 receives an input from the user through the operation display unit 30 (Step S15). When detecting an input through pressing of an icon (Step S16), the input controller 321 transmits pressed icon information to the controller unit 1 through the second communication unit 323 (Step S17).

The function controller 103 of the controller unit 1 operates its system according to the pressed icon information received through the first communication unit 104 (Step S18).

As explained above, in the image forming apparatus 100 according to the first embodiment, first, the controller unit 1 stores therein the screen configuration data for the operation screen to be displayed on the basic display panel of a predetermined size. When it is determined that the display of the operation screen on the display panel 32 of the display unit 3 needs to be updated, the controller unit 1 transmits the screen configuration data corresponding to the operational state of the device at that time to the display unit 3. Meanwhile, the display unit 3 converts the screen configuration data received from the controller unit 1 based on the size of the basic display panel and the size of the display panel 32 of its own, and uses the converted data to update the display of the operation screen on the display panel 32.

Thus, according to the first embodiment, it is possible to flexibly generate the operation screen while suppressing an increase in the amount of a previously generated basic image (screen configuration data). Consequently, it is possible to implement the image forming apparatus capable of generating the operation screens of various sizes in the display unit 3 and obtaining a scalable configuration without being affected by the size of the display panel 32.

The controller unit 1 and the display unit 3 are connected to each other through USB communication. Thus, by using an inexpensive general-purpose product for a transmitter/receiver device, cost can be suppressed and general-purpose program codes can be used for software, which allows reduction in both a period for its design and development cost.

Figure 6:
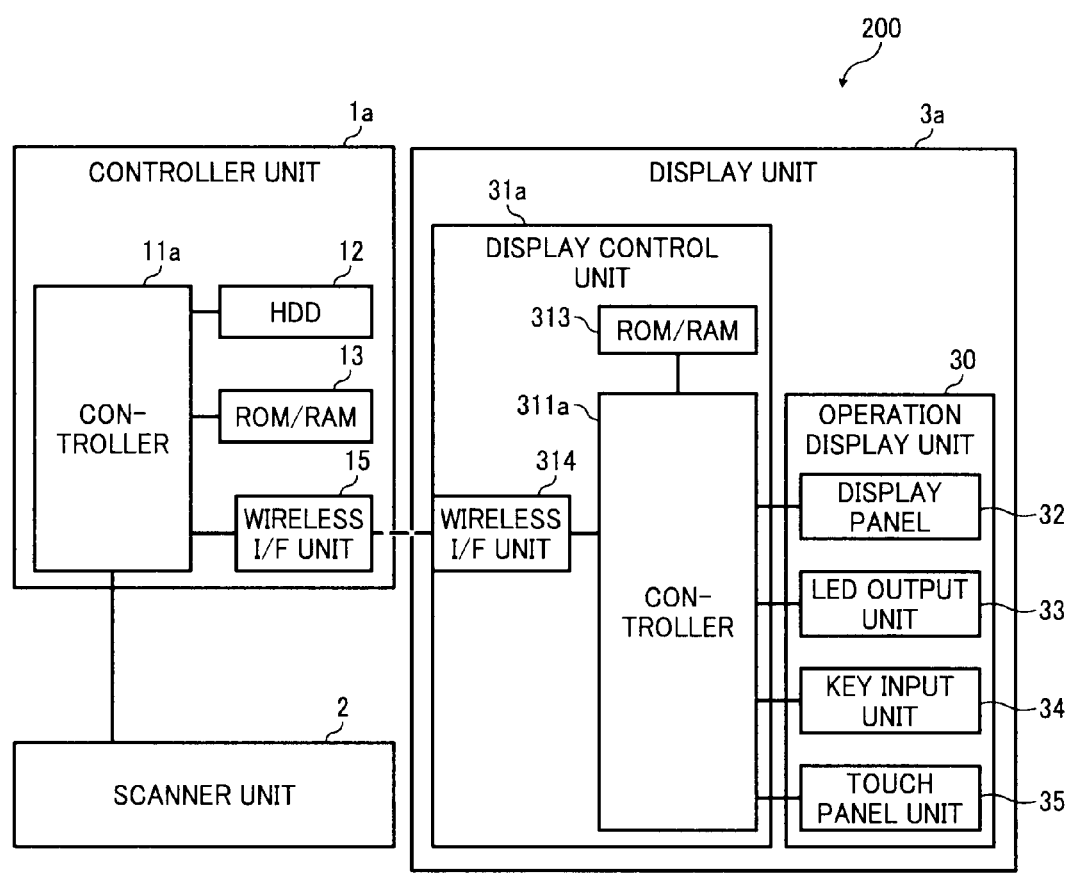
FIG. 6 is a diagram of a hardware configuration of an image forming apparatus according to a modification of the first embodiment.

FIG. 6 is a diagram of a hardware configuration of an image forming apparatus 200 according to a modification of the first embodiment. The image forming apparatus 200 includes a controller unit 1a and a display unit 3a. In the image forming apparatus 200, the communication interface (USB HOST) 14 provided in the controller unit 1 of the image forming apparatus 100 and the communication interface (USB I/F) 312 provided in the display unit 3 thereof are replaced with wireless I/F units 15 and 314 respectively, and the controller unit 1a and the display unit 3a thereby perform wireless communication with each other. It is noted that a wireless communication system is not particularly specified.

The rest of components in the image forming apparatus 200 are the same as these of the image forming apparatus 100, and thus the same reference numerals are assigned to the components except for a display control unit 31a and a controller 311a, and explanation thereof is omitted. The process for controlling the update of the operation screen explained in the first embodiment is also applicable to the image forming apparatus 200 with the configuration in which the controller unit 1a and the display unit 3a perform the wireless communication with each other, and the same effect can be obtained.

In a second embodiment of the present invention, a function of generating the second operation screen using character font data is added to the functions of the image forming apparatus 100 according to the first embodiment.

Figure 7:
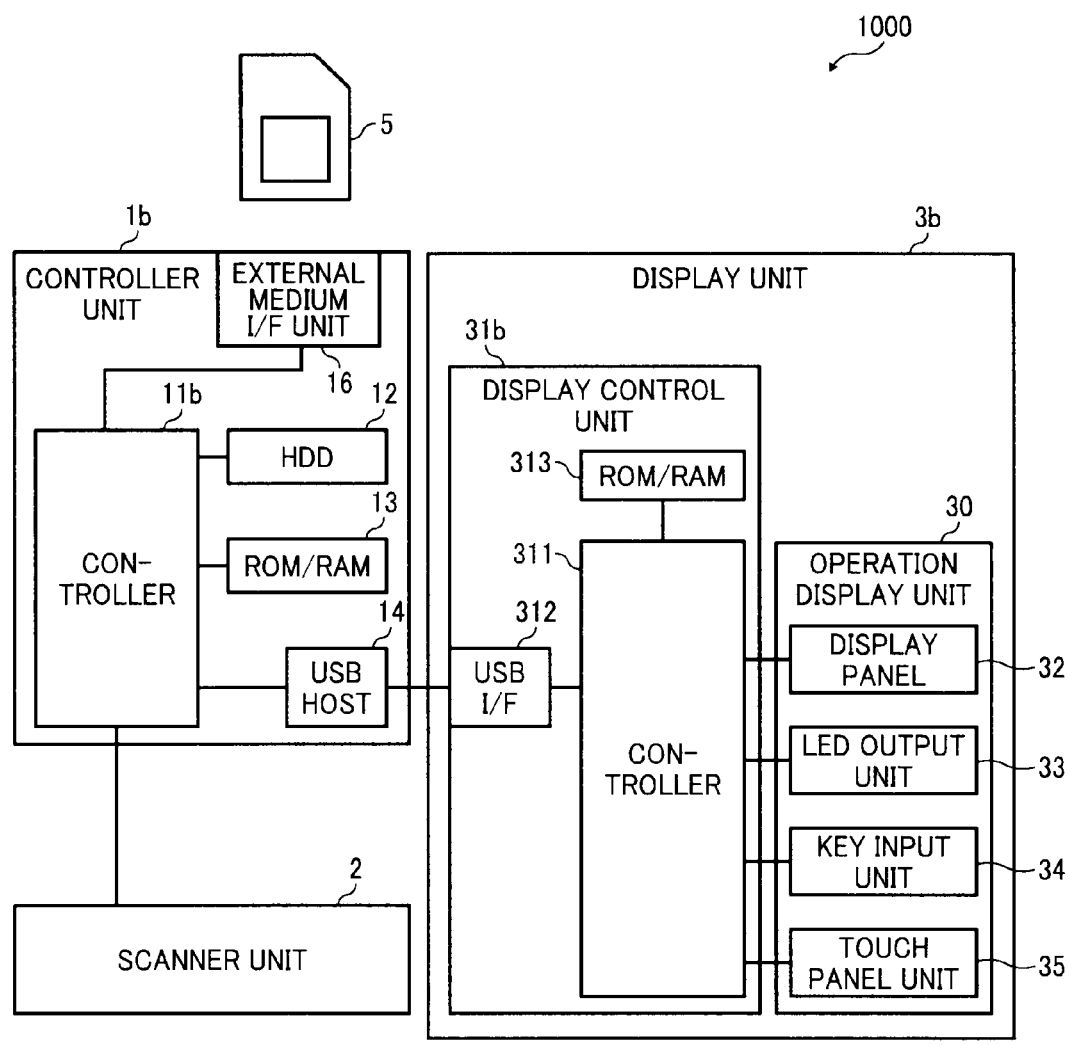
FIG. 7 is a diagram of a hardware configuration of an image forming apparatus according to a second embodiment of the present invention.

FIG. 7 is a diagram of a hardware configuration of an image forming apparatus 1000 according to the second embodiment. The image forming apparatus 1000 includes a controller unit 1b and a display unit 3b. The image forming apparatus 1000 also includes an external medium I/F unit 16 additionally provided to the image forming apparatus 100 as shown in the first embodiment. The external medium I/F unit 16 is an interface to connect an external storage medium 5 such as a secured digital (SD) card to the controller unit 1b. The rest of components in the image forming apparatus 1000 are the same as these of the image forming apparatus 100, and thus explanation thereof is omitted.

Next, configurations and functions of components provided in a controller 11b of the controller unit 1b and in a controller 311b of a display control unit 31b of the display unit 3b are explained below. The rest of the components in the image forming apparatus 1000 are the same as these of the image forming apparatus 100, and thus the same reference numerals are assigned to the components and explanation thereof is omitted.

Figure 8:
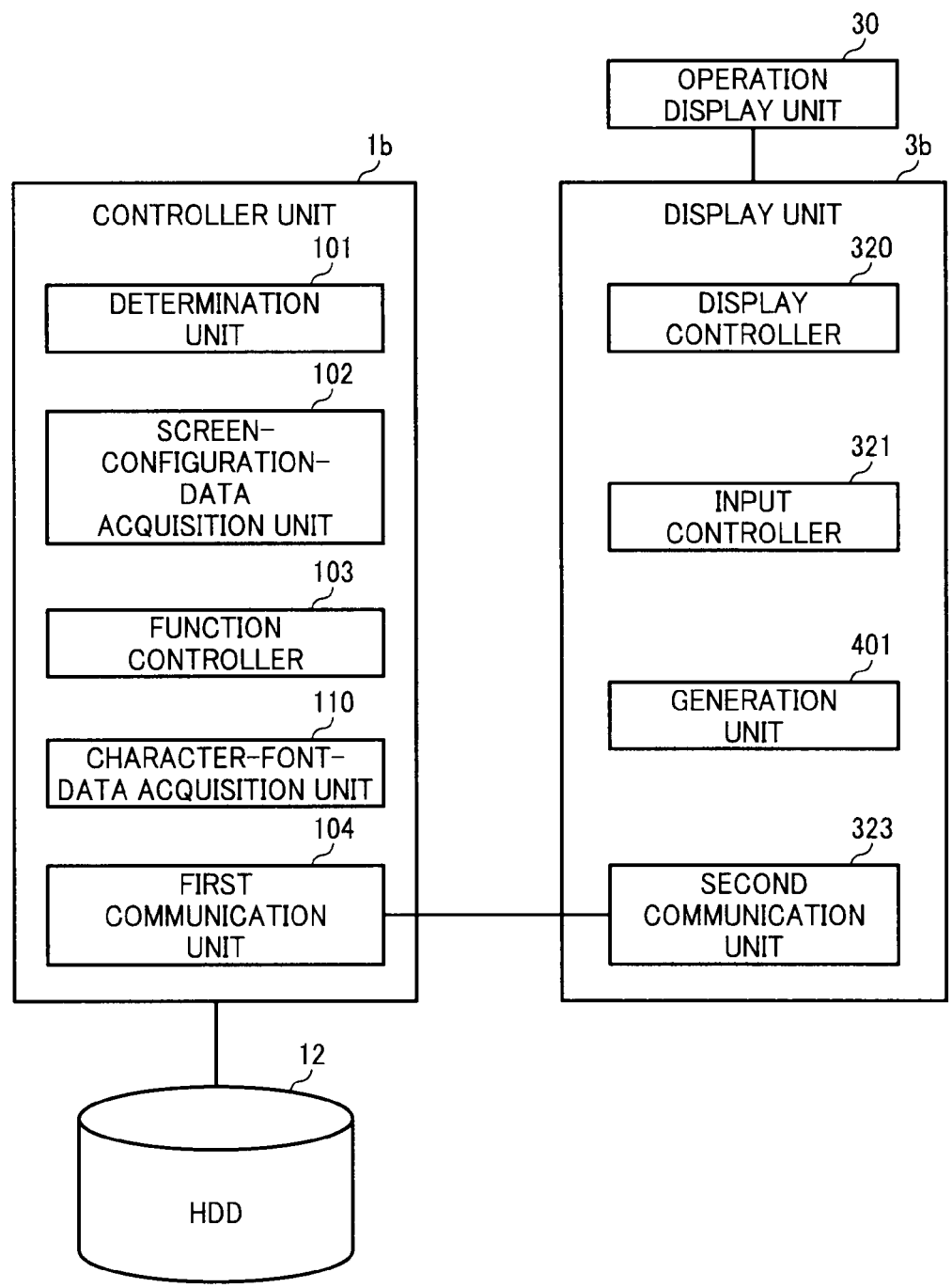
FIG. 8 is a block diagram of a functional configuration of a controller unit and of a display unit in FIG. 7.

FIG. 8 is a block diagram of a functional configuration of the controller 11b of the controller unit 1b and of the controller 311b of the display unit 3b. The controller 11b includes the determination unit 101, the screen-configuration-data acquisition unit 102, the function controller 103, a character-font-data acquisition unit 110, and the first communication unit 104. The controller 311b includes the display controller 320, the input controller 321, a generation unit 401, and the second communication unit 323.

In the second embodiment, configurations and functions of the character-font-data acquisition unit 110 and the generation unit 401 are explained below. The configurations and the functions of the rest of the components are the same as these of the first embodiment, and thus explanation thereof is omitted.

When receiving the screen configuration data from the controller unit 1b, the generation unit 401 checks whether any display text is included in display elements of the screen configuration data. When it is checked that the display text is included therein, the generation unit 401 sends a request for acquisition of character font (which is displayed on the operation screen) data corresponding to the display text to the controller unit 1b through the second communication unit 323.

When receiving the request for the acquisition from the display unit 3b, the character-font-data acquisition unit 110 checks whether the character font corresponding to a content of the request is stored in the external storage medium 5. When it is stored therein, then the character-font-data acquisition unit 110 reads and transfers the corresponding character font to the display unit 3b.

Figure 9:
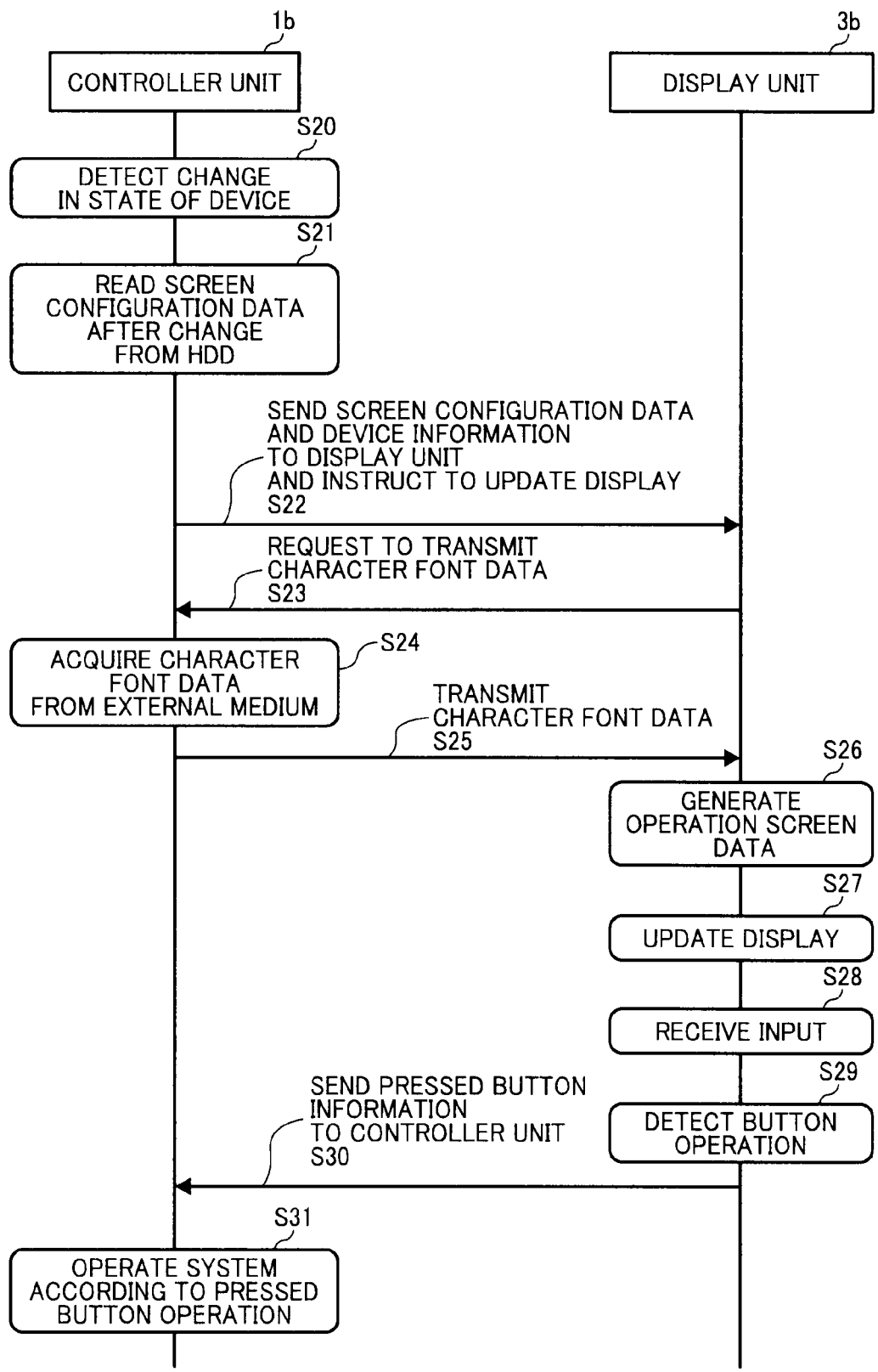
FIG. 9 is a sequence diagram of a procedure for an operation-screen updating process.

A procedure for an operation-screen updating process performed by the controller unit 1b and the display unit 3b is explained below. FIG. 9 is a sequence diagram of the procedure for the operation-screen updating process.

The processes from Step S20 to Step S22 are the same as these from Step S10 to Step S12 in the sequence diagram indicating the procedure for the operation-screen updating process performed by the image forming apparatus 100 according to the first embodiment as explained with reference to FIG. 5, and thus explanation thereof is omitted.

At Step S23, the generation unit 401 checks whether the display text is included in the received screen configuration data. When it is checked that the display text is included therein, then the generation unit 401 sends a request for acquisition of the character font data to the controller unit 1b through the second communication unit 323 (Step S23).

The controller unit 1b receives the request for the acquisition from the display unit 3b through the first communication unit 104, and the character-font-data acquisition unit 110 acquires the character font data from the external storage medium 5 (Step S24). Specifically, when the request for the acquisition is received from the display unit 3b when the external storage medium 5 with the character font data stored therein is connected to the external medium I/F unit 16, the character-font-data acquisition unit 110 checks whether the character font data corresponding to the content of the request is stored in the external storage medium 5. When the character font data is stored therein, the character-font-data acquisition unit 110 reads the corresponding character font data therefrom.

The character-font-data acquisition unit 110 acquires the character font data, and transmits the acquired character font data to the display unit 3b through the first communication unit 104 (Step S25).

The generation unit 401 acquires the character font data through the second communication unit 323, and generates the operation screen data (Step S26). The processes from Step S27 to Step S31 are the same as these from Step S14 to Step S18 in the sequence diagram in FIG. 5 as explained in the first embodiment, and thus explanation thereof is omitted.

Such a configuration allows multilingualization in the display of the operation screen without narrowing both the storage areas of the controller unit 1b and the display unit 3b.

The controller unit 1b and the display unit 3b may be configured to provide the wireless I/F units 15 and 314 instead of the USB HOST 14 and the USB I/F 312, respectively. Specifically, wireless communication may be used to issue the request for acquisition of the character font data and transmit the character font data. Moreover, the controller unit 1b does not provide the external medium I/F unit 16 but the display unit 3b may provide the external medium I/F unit 16. Although the font data corresponding to each language is acquired in the second embodiment, the font data is not limited thereto, and thus font data corresponding to any font type such as Mincho type and Gothic type may be acquired.

Figure 10:
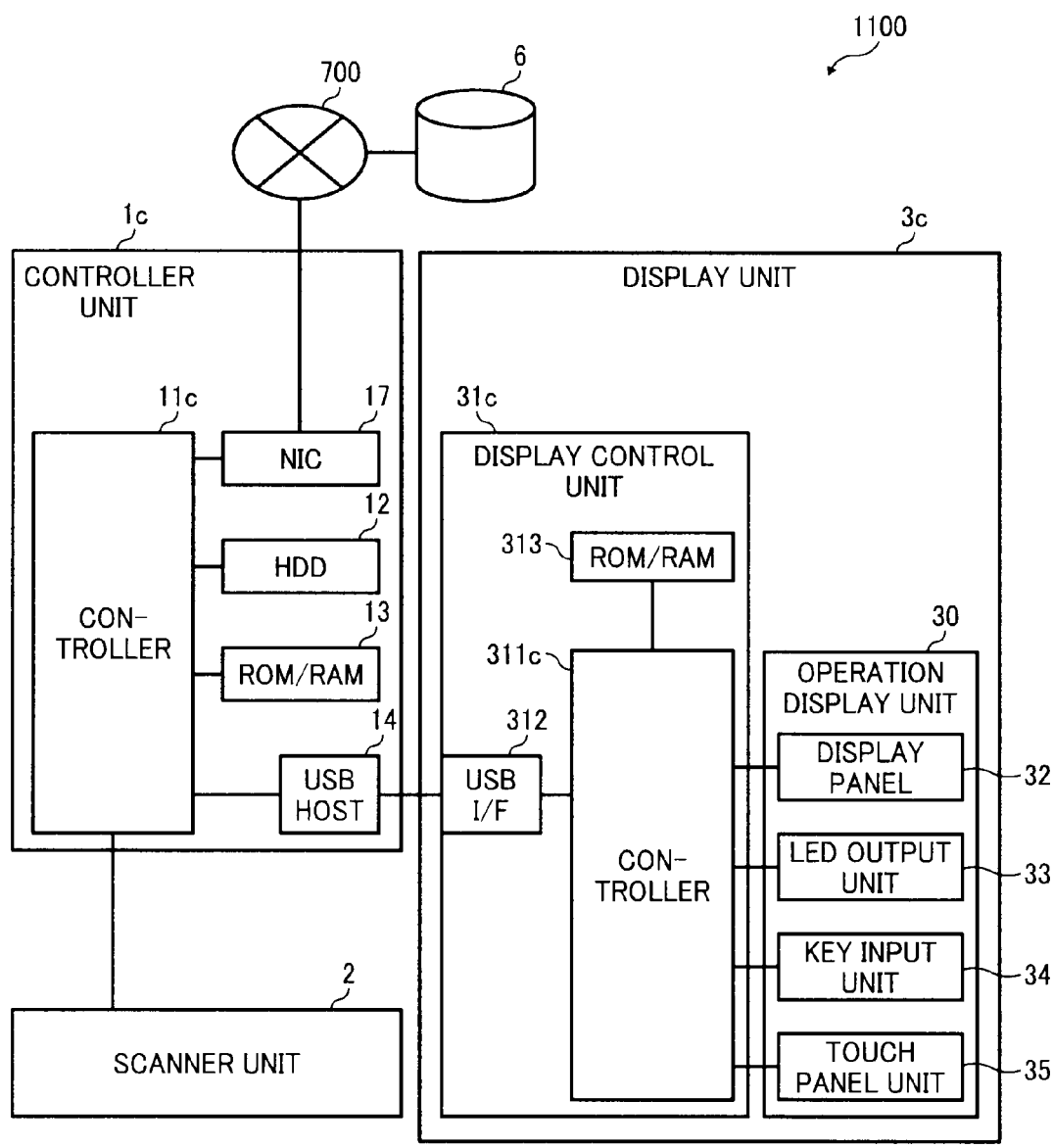
FIG. 10 is a diagram of a hardware configuration of an image forming apparatus according to a modification of the second embodiment.

FIG. 10 is a diagram of a hardware configuration of an image forming apparatus 1100 according to a modification of the second embodiment. The image forming apparatus 1100 includes a controller unit 1c and a display unit 3c, which are connected to a character font server 6 through a network 700. In the image forming apparatus 1100, a network interface card (NIC) 17 is added to the controller unit 1 provided in the image forming apparatus 100 according to the first embodiment. The NIC 17 is a communication unit used to connect the controller unit 1c to the network 700.

Figure 11:
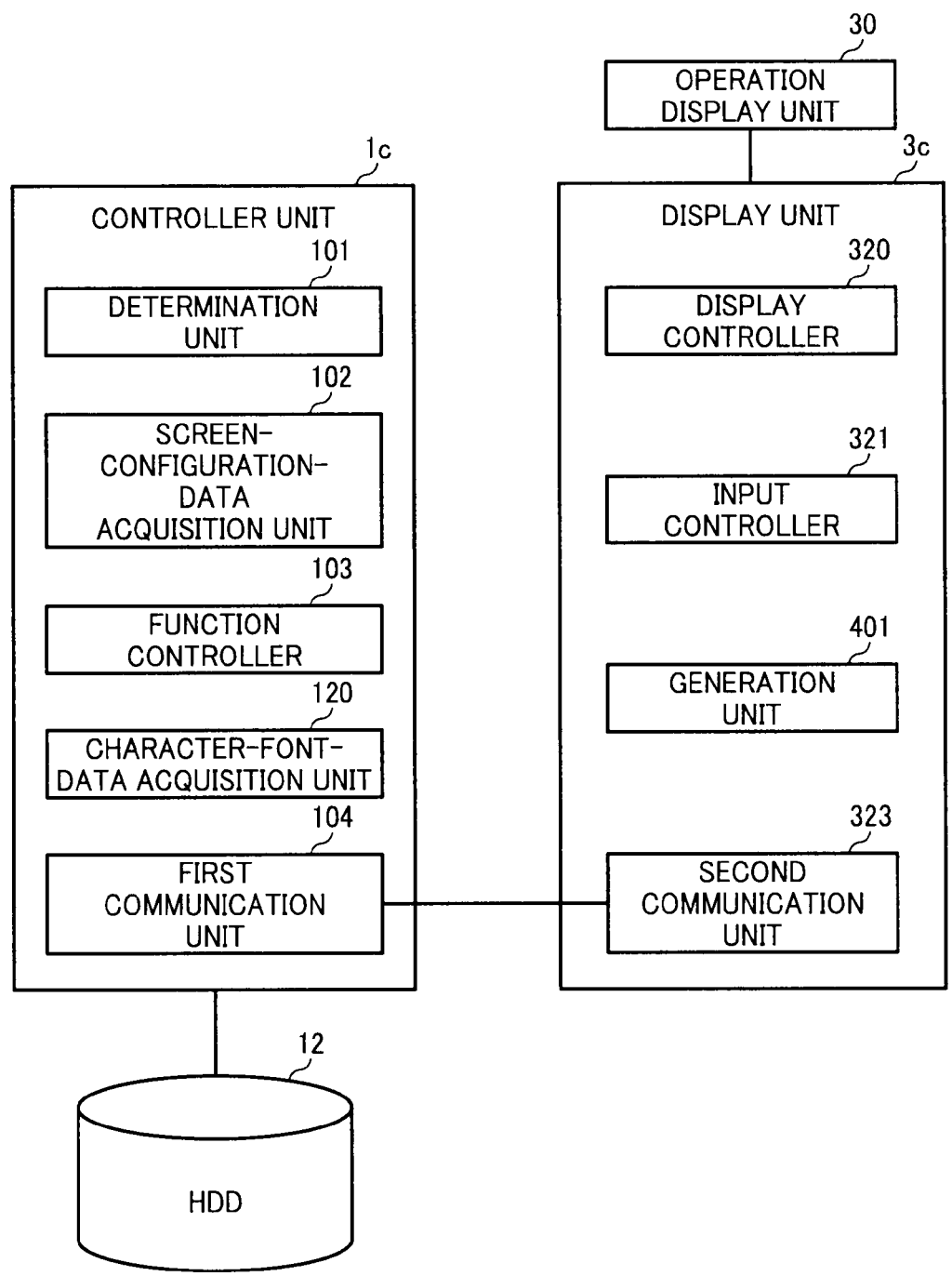
FIG. 11 is a block diagram of a functional configuration of a controller in a controller unit and of a controller in a display unit in FIG. 10.

FIG. 11 is a block diagram of a functional configuration of a controller 11c (FIG. 10) of the controller unit 1c and of a controller 311c of a display control unit 31c (FIG. 10) of the display unit 3c. The controller 11c includes the determination unit 101, the screen-configuration-data acquisition unit 102, the function controller 103, a character-font-data acquisition unit 120, the first communication unit 104, and the HDD 12. The configuration of the controller unit 1c except for the character-font-data acquisition unit 120 and the configuration of the display unit 3c are the same as these of the second embodiment. Thus explanation thereof is omitted.

When receiving the request for acquisition of the character font data from the display unit 3c, the character-font-data acquisition unit 120 checks whether the character font data corresponding to a content of the request can be acquired through the network 700. Specifically, it is checked whether desired character font data is stored in the character font server 6 which is in an accessible state. When the desired character font data is stored therein, the character-font-data acquisition unit 120 acquires the corresponding character font data from the character font server 6 and transmits the acquired data to the display unit 3c.

The operation-screen updating process performed by the image forming apparatus 1100 is the same as the operation-screen updating process performed by the image forming apparatus 1000, and thus explanation thereof is omitted.

In the case of employing the configuration of the image forming apparatus 1100, similarly to the image forming apparatus 1000, the multilingualization in the display of the operation screen can also be achieved without narrowing both the storage areas of the controller unit 1c and the display unit 3c.

The controller unit 1c and the display unit 3c may be configured to provide the wireless I/F units 15 and 314 instead of the USB HOST 14 and the USB I/F 312, respectively. Specifically, the wireless communication may be used to issue the request for acquisition of the character font data and transmit the character font data. Moreover, the wireless communication may be used to connect the NIC 17 to the network 700.

In the first and the second embodiments, the generation unit that generates the operation screen is provided in the display unit. On the other hand, in a third embodiment of the present invention, a controller unit includes a generation unit. The generation unit acquires configuration information for configuring a display unit from the display unit, and generates an operation screen based on the configuration information.

Figure 12:
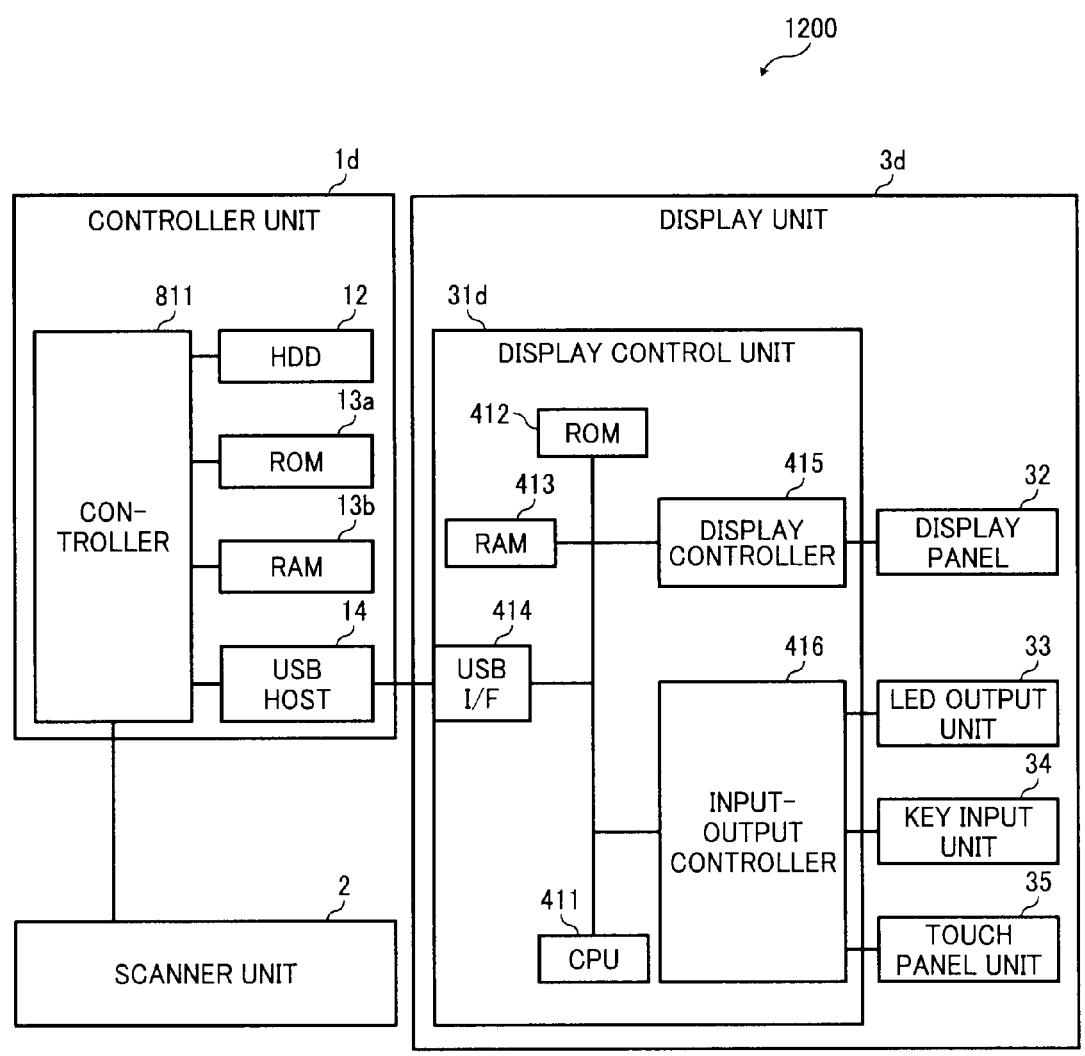
FIG. 12 is a diagram of a hardware configuration of an image forming apparatus according to a third embodiment of the present invention.

FIG. 12 is a diagram of a hardware configuration of an image forming apparatus 1200 according to the third embodiment. The image forming apparatus 1200 includes a controller unit 1d and a display unit 3d. The configuration of the controller unit 1d is the same as that of the first and the second embodiments except for a ROM 13a and a RAM 13b which are separated from the ROM/RAM 13 in FIG. 1, and thus only the configuration of the display unit 3d is explained below.

The display unit 3d includes, as an input unit, the key input unit 34 that receives an input event through pressing of a hardware key (key switch) and the touch panel unit 35 that receives an input event through touch of a software key. The display unit 3d also includes, as an output unit, the display panel 32 corresponding to a display and a light-emitting diode (LED) output unit 33 that applies a voltage to an LED being a light source of a backlight of the display.

The display unit 3d also includes a display control unit 31d as a controller that controls the input and output units, and these components are mutually connected to each other through a bus.

The display control unit 31d includes a controller (CPU) 411, a ROM 412, a RAM 413, a USB I/F 414, a display controller 415, and an input-output controller 416, which are mutually connected to each other through a bus.

In the display control unit 31d, the CPU 411 reads a program stored in the ROM 412 to the RAM 413 and executes the program, to control incorporated units and implement the whole of the display unit 3d.

The display control unit 31d is mutually connected to the USB HOST 14 of the controller unit 1d through the USB I/F 414 which is a data communication I/F using the USB, and a communication channel is established between the controller unit 1d and the display unit 3d, to enable data communication.

The display controller 415 of the display control unit 31d is connected with the display panel 32, to control the display panel 32 so as to transfer image data to be displayed or the like. The input-output controller 416 is connected with the LED output unit 33, the key input unit 34, and the touch panel unit 35, to control input/output such as application of voltage to the LED and reception of an input event.

With the configuration, in the controller unit 1*d*, when an input event of a request for scanning an original is received from the user through, for example, the key input unit 34 of the display unit 3*d*, receipt of the input event is notified from the display unit 3*d* to a controller 811, and the controller 811 instructs the scanner unit 2 to scan the original. Consequently, the scanner unit 2 scans the original according to the operation instruction, and the scanned image is transferred to the display unit 3*d* through the controller unit id and is displayed on the display panel 32.

The image forming apparatus 1200 provided with the hardware configuration has "display control functions" in which the controller unit 1*d* generates a display screen (screen data) according to device specifications of the display unit 3*d* based on the information (configuration information) for the device acquired from the display unit 3*d* and the display unit 3*d* displays the generated display screen.

Thus, the image forming apparatus 1200 can display an appropriate screen according to the hardware configuration and the functional configuration of the display unit 3*d* changed by the request from the user.

Figure 13:
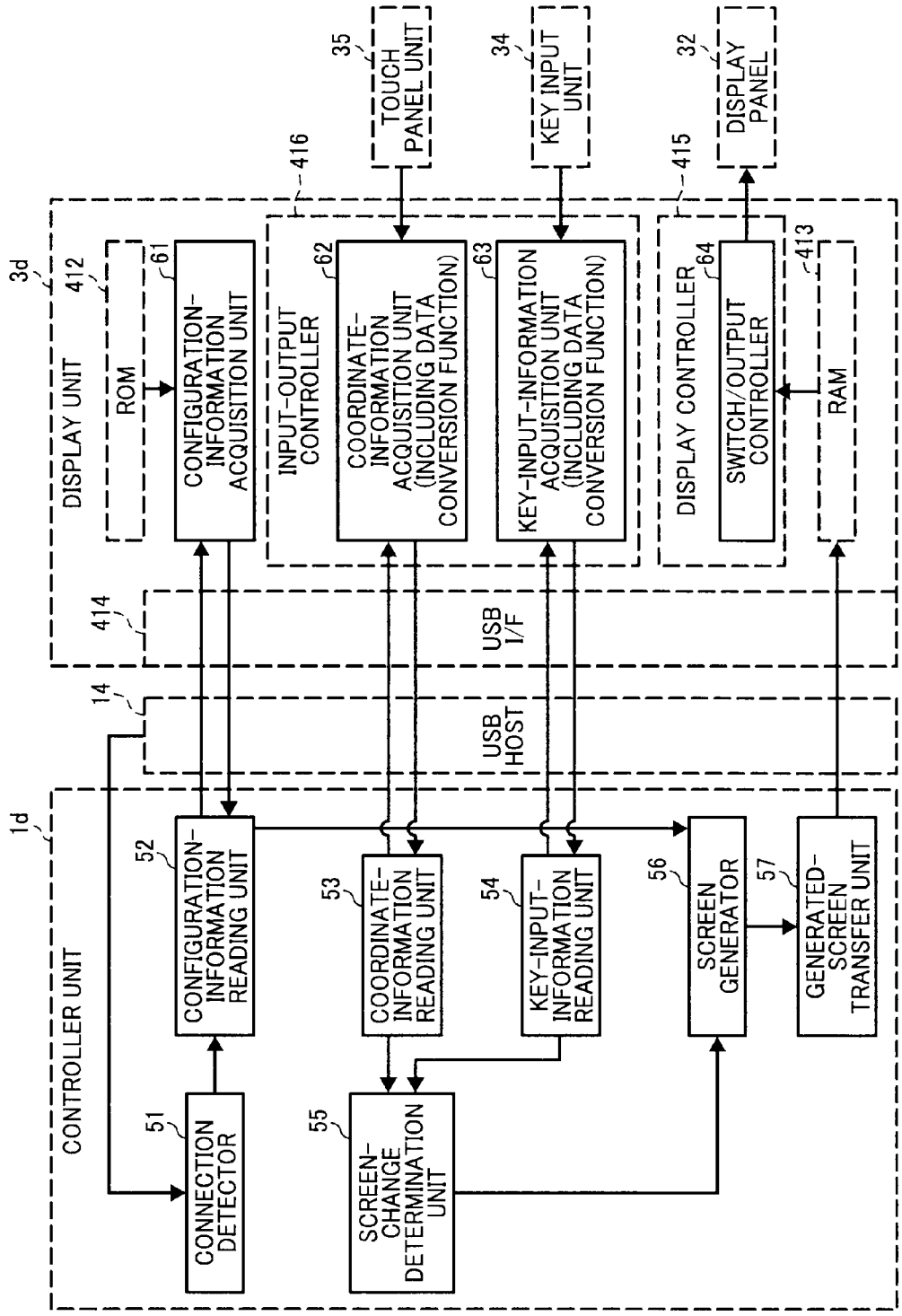
FIG. 13 is a block diagram of a functional configuration of the image forming apparatus according to the third embodiment.

FIG. 13 is a block diagram of the functional configuration of the image forming apparatus 1200. The display control functions of the image forming apparatus 1200 are implemented by performing cooperative operation between function units operated by the controller unit 1*d* and function units operated by the display unit 3*d*.

As shown in FIG. 13, the function units operated by the controller unit 1*d* are a connection detector 51, a configuration-information reading unit 52, a coordinate-information reading unit 53, a key-input-information reading unit 54, a screen-change determination unit 55, a screen generator 56, and a generated-screen transfer unit 57. The function units operated by the display unit 3*d* are a configuration-information acquisition unit 61, a coordinate-information acquisition unit 62, a key-input-information acquisition unit 63, and a switch/output controller 64.

The cooperative operation between both the function units is explained in detail below. The display control functions according to the third embodiment provide display control "(A) when the display device is changed (replaced)" and "(B) when the display screen is changed (switched) after the display device is changed". Therefore, each control timing indicated by (A) and (B) is explained below.

(A) Display Control when the Display Unit 3*d* is Changed

The function units operated by the controller unit id when the display unit 3*d* is changed are explained below.

The connection detector 51 detects whether the display unit 3*d* is connected to the image forming apparatus 1200. A method of detecting the connection is implemented by, for example, determining whether a communication channel is established between the USB HOST 14 and the USB I/F 414 of the display unit 3*d*.

The configuration-information reading unit 52 reads configuration information stored in the display unit 3*d* from the display unit 3*d* connected to the image forming apparatus 1200.

The display unit 3*d* previously stores, as a data file, a hardware configuration of the device and device information including a functional configuration in the ROM 412 of the display unit 3*d*. The data file corresponds to the configuration information.

The configuration information is formed with information for a screen size that can be displayed by the display panel 32 and for whether a full color display is available, information for a display (output) such as the number of LEDs, information for the number of key switches and functions corresponding to the respective key switches, and information for an input as to whether the touch panel unit 35 is attached to the display unit 3*d*.

To cause the configuration-information reading unit 52 to read the configuration information, data communication has to be established between the image forming apparatus 1200 and the display unit 3*d*.

Therefore, the configuration-information reading unit 52 functions based on the result of detection by the connection detector 51. Specifically, when the display unit 3*d* is connected to the image forming apparatus 1200, the configuration-information reading unit 52 requests the configuration-information acquisition unit 61 operated by the display unit 3*d*, explained later, to acquire the configuration information.

The screen generator 56 generates a display screen (image data formed with at least one graphic component) according to the hardware configuration and the functional configuration of the display unit 3*d* connected thereto, based on the acquired configuration information. Therefore, the screen generator 56 generates screen data suitable for a display area supported by the display panel 32 of the display unit 3*d*, based on the screen size in the configuration information. A method of generating the screen data is implemented by resizing (enlarging/reducing) original data according to the screen size based on a ratio between an image size of the original data and the acquired screen size, and generating screen data suitable for the display area.

The generated-screen transfer unit 57 transfers the generated screen data to the display unit 3*d* through the communication channel.

Next, functions operated by the display unit 3*d* are explained below.

The configuration-information acquisition unit 61 is a function corresponding to the configuration-information reading unit 52 operated by the controller unit 1*d*, and acquires the configuration information requested for its acquisition from the ROM 412 of the display unit 3*d*.

The switch/output controller 64 is a function corresponding to the generated-screen transfer unit 57 operated by the controller unit 1*d*. The switch/output controller 64 switches the screen currently displayed on the display panel 32 to a screen based on the image data transferred by the generated-screen transfer unit 57, and displays the screen. It is noted that the switch/output controller 64 is a function operated by the display controller 415 of the display unit 3*d*.

Figure 14:
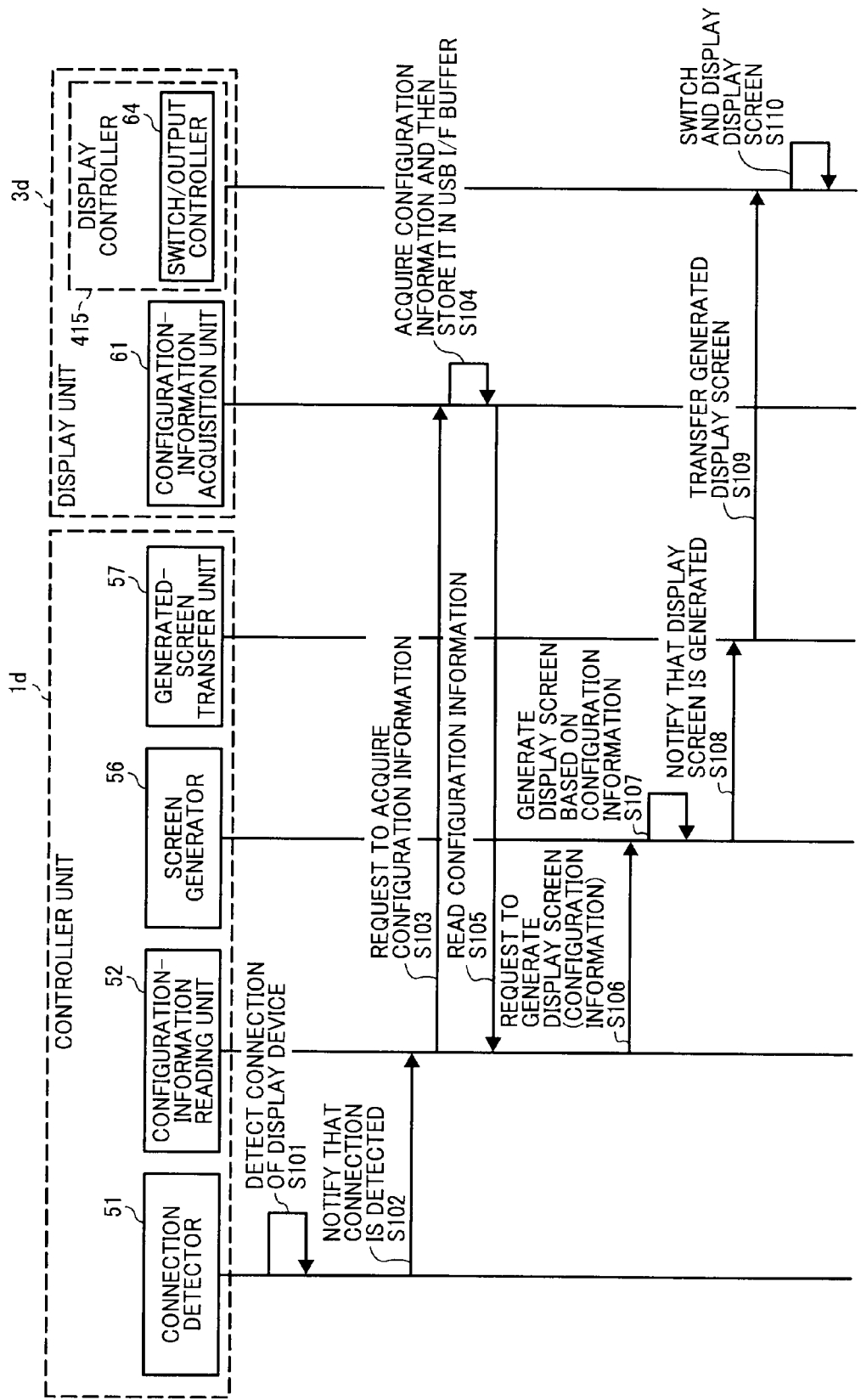
FIG. 14 is a sequence diagram of an example of a procedure for screen display when a display device is changed.

FIG. 14 is a sequence diagram of an example of a procedure for screen display when the display device is changed. In the image forming apparatus 1200, first, the connection detector 51 operated by the controller unit id detects that the display unit 3*d* is connected thereto (Step S101).

When the connection is detected, the detection is notified to the configuration-information reading unit 52 (Step S102), and the configuration-information reading unit 52 requests the configuration-information acquisition unit 61, operated by the display unit 3*d*, to acquire the configuration information for the display unit 3*d* (Step S103).

The configuration-information acquisition unit 61 reads the configuration information stored in the ROM 412 of the display unit 3*d*, writes or stores the information in a transmission/reception buffer (storage area for data transmission/reception) of the USB I/F 414 (Step S104), and notifies the configuration-information reading unit 52 being an information-acquisition request source operated by the controller unit 1d to that effect.

Consequently, the configuration-information reading unit 52 starts reading the configuration information written in the transmission/reception buffer of the USB I/F 414 through the communication channel (Step S105).

The configuration-information reading unit 52 reads the configuration information, and requests the screen generator 56 to generate a display screen according to the hardware configuration and the functional configuration of the display unit 3d (Step S106). At this time, the configuration-information reading unit 52 transfers the read configuration information to the screen generator 56 and requests the screen generator 56 to generate the screen.

The screen generator 56 generates screen data suitable for the display area of the display panel 32 based on the screen size in the received configuration information, and temporarily stores the generated screen data in the RAM 13b of the controller unit 1d (Step S107).

When the display screen is generated, the generation is notified to the generated-screen transfer unit 57 operated by the controller unit 1d (Step S108), and the generated-screen transfer unit 57 writes or stores the generated screen data in the transmission/reception buffer of the USB I/F 414 in the display unit 3d through the communication channel, and notifies the switch/output controller 64 operated by the display unit 3d (further by the display controller 415) to that effect.

Consequently, the switch/output controller 64 starts reading the screen data written in the transmission/reception buffer of the USB I/F 414, so that the screen data is transferred from the generated-screen transfer unit 57 (Step S109). At this time, the transferred screen data is temporarily stored in the RAM 413 of the display unit 3d.

When receiving a message indicating storage of the screen data in the RAM 413, the switch/output controller 64 reads the screen data therefrom, and controls switching of the display screen and display (output) timing thereof (Step S110).

Accordingly, the display screen of the display panel 32 is switched, so that the user interface (UI) environment excellent in operability and convenience for the users can be provided.

As explained above, in the controller unit 1d side of the image forming apparatus 1200, the function units operated by the controller unit 1d are configured to generate the screen data according to the device specifications of the display unit 3d based on the configuration information acquired from the connected display unit 3d. Meanwhile, in the display unit 3d side of the image forming apparatus 1200, the function units operated by the display unit 3d are configured to display the screen based on the screen data generated by the controller unit 1d.

(B) Display Control when the Display Screen is Changed after the Display Device is Changed <<Functions Operated by the Controller Unit>>

The function units operated by the controller unit 1d after the display unit 3d is changed are explained below.

The controller unit 1d has the function units for reading input information that is acquired from the touch panel unit 35 and/or from the key input unit 34 being the input device provided in the display unit 3d and is stored. Specifically, the function units are configured to read the various data that are output from the touch panel unit 35 and/or from the key input unit 34 to the input-output controller 416 through input operations using the input devices, from the display unit 3d to the controller unit 1d.

The coordinate-information reading unit 53 reads coordinate information (e.g., "coordinate values [x, y] indicating a position of a touch input in a display area of the display unit 3d") at the time of the touch input received by the display unit 3d connected to the image forming apparatus 1200 through the touch panel unit 35.

The key-input-information reading unit 54 reads key-input information (e.g., "identification information of a key input event indicating a request operation instructed through an input operation") at the time of the key input received by the display unit 3d connected to the image forming apparatus 1200 through the key input unit 34.

The screen-change determination unit 55 determines whether the display screen needs to be changed caused by an operation (touch input and/or key input) input by the user through the input devices. Specifically, the screen-change determination unit 55 determines whether screen data suitable for the display area of the display panel 32 needs to be generated by the screen generator 56 because the display screen is switched by the input operation.

The screen-change determination unit 55 performs the determination based on the coordinate information received from the coordinate-information reading unit 53 or based on the key-input information received from the key-input-information reading unit 54.

When receiving the coordinate information (through touch input), the screen-change determination unit 55 compares currently received coordinate information with previously received coordinate information, and performs determination based on the result of comparison. More specifically, when the comparison results in mutually different coordinate information (when the coordinate information is changed from the previously received coordinate information), the screen-change determination unit 55 determines that there is a new touch input, specifies an instructed operation request based on the received coordinate information, and determines that the display screen needs to be changed.

When receiving the key-input information (through key input), similarly to the reception of the coordinate information, the screen-change determination unit 55 compares currently received key-input information with previously received key-input information, and performs determination based on the result of comparison. More specifically, when the comparison results in mutually different key-input information (when the key-input information is changed from the previously received key-input information), the screen-change determination unit 55 determines that there is a new key input, specifies an instructed operation request based on the received key-input information, and determines that the display screen needs to be changed.

When it is determined using the determination method that the display screen needs to be changed, the screen-change determination unit 55 instructs the screen generator 56 to generate the screen data suitable for the display area of the display panel 32.

As explained above, the screen-change determination unit 55 determines whether an input operation has been performed or whether the display screen needs to be changed, based on the coordinate information or the key-input information. Based on these processes, the coordinate-information reading unit 53 and/or the key-input-information reading unit 54 periodically access the display unit 3d through the communication channel, while the display unit 3d reads each information acquired from the touch panel unit 35 and/or the key input unit 34, and transfers the read information to the screen-change determination unit 55. The screen-change determination unit 55 temporarily stores the received information in the RAM 13*b* and uses it for determination.

Next, the functions operated by the display unit 3*d* are explained below. The display unit 3*d* has function units that acquire input information from the touch panel unit 35 and/or the key input unit 34 which are the input devices provided therein. Specifically, these function units are configured to acquire various data (output data), as input information, output from the touch panel unit 35 and/or the key input unit 34 to the input-output controller 416 by the input operation through the various input devices.

The coordinate-information acquisition unit 62 is a function corresponding to the coordinate-information reading unit 53 operated by the controller unit 1*d*, and acquires the coordinate information based on output data (input information from the touch panel unit 35) at the time of a touch input received by the touch panel unit 35 of the display unit 3*d* through the input operation.

Here, if a liquid-crystal touch panel is used for an operation panel, an optical-sensor liquid-crystal pad can be used. The optical-sensor liquid-crystal pad is a device that has a built-in optical sensor provided in a plane of a transistor in the liquid crystal panel and recognizes multi-touch of user's finger, a movement of a pen, and a shape on the surface of the liquid-crystal panel. It is noted that when the optical-sensor liquid-crystal pad is used, there is no need to provide a touch sensor or a protective layer on the surface of the liquid crystal panel unlike a resistance-film type or a capacitance type liquid crystal touch panel, and multi-touch of user's finger, a movement of a pen, and a shape can be recognized on the surface of the liquid crystal panel.

The key-input-information acquisition unit 63 is a function corresponding to the key-input-information reading unit 54 operated by the controller unit 1*d*, and acquires the key-input information based on the output data (input information from the key-input unit 34) at the time of a key input received by the key-input unit 34 of the display unit 3*d* through the input operation.

The output data obtained when the touch panel unit 35 and/or the key input unit 34 of the display unit 3*d* receives the data through the input operation is used afterward for a determination process performed by the screen-change determination unit 55 operated by the controller unit 1*d*. However, the output data is not limited to data in a format usable for the determination process.

Therefore, the coordinate-information acquisition unit 62 and/or the key-input-information acquisition unit 63 converts the output data from the touch panel unit 35 and/or the key input unit 34 to data usable for the determination process performed by the screen-change determination unit 55. For example, the coordinate-information acquisition unit 62 converts the data, output from the touch panel unit 35 to the input-output controller 416 at the time of the touch input, to coordinate data indicating a position of the touch input. Likewise, the key-input-information acquisition unit 63 converts the data, output from the key-input unit 34 to the input-output controller 416 at the time of the key input, to data usable for a subsequent determination process (identification information for the key input event).

It is noted that the coordinate-information acquisition unit 62 and/or the key-input-information acquisition unit 63 are functions operated by the input-output controller 416 of the display unit 3*d*.

(B-1) At the Time of Touch Input

Figure 15:
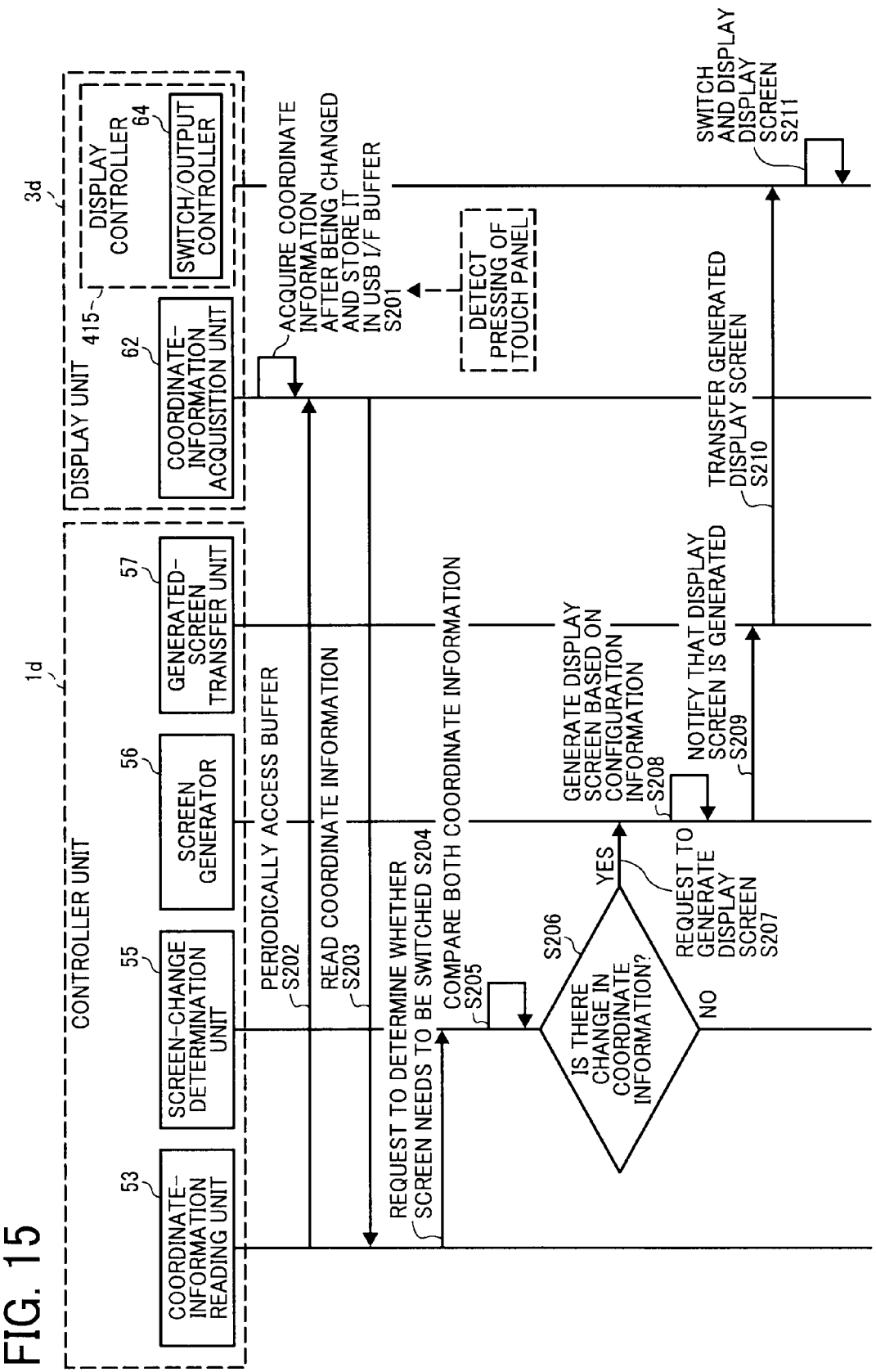
FIG. 15 is a sequence diagram of an example of a procedure for screen display at the time of a touch input.

FIG. 15 is a sequence diagram of an example of a procedure for screen display at the time of a touch input according to the third embodiment.

In the image forming apparatus 1200, first, the touch panel unit 35 of the display unit 3*d* receives the touch input (pressing of the touch panel), and the coordinate-information acquisition unit 62 acquires the coordinate information based on the output data corresponding to the received touch input and writes the acquired coordinate information to the transmission/reception buffer of the USB I/F 414 of the display unit 3*d* (stores the coordinate information in the buffer) (Step S201). At this time, the coordinate-information acquisition unit 62 converts the data output from the touch panel unit 35 to the input-output controller 416 to coordinate data, and writes the coordinate data to the buffer.

Meanwhile, in the controller unit 1*d*, the coordinate-information reading unit 53 periodically accesses the transmission/reception buffer of the USB I/F 414 of the display unit 3*d* through the communication channel (Step S202).

The coordinate-information reading unit 53 reads the coordinate information written to the buffer (Step S203), and requests the screen-change determination unit 55 to determine whether the display screen needs to be changed (the display screen is switched) caused by the input operation (Step S204). At this time, the coordinate-information reading unit 53 transfers the read coordinate information to the screen-change determination unit 55 and requests the determination therefrom.

The screen-change determination unit 55 compares the coordinate information received from the coordinate-information reading unit 53 at the time of previous input operation with the coordinate information received at Step S204, and performs the determination (Step S205).

When the both data are different from each other (there is a change in the coordinate information) (YES at Step S206), the screen-change determination unit 55 determines that the display screen has been changed due to the input operation and a new display screen after the screen is changed needs to be generated, and requests the screen generator 56 to generate a display screen according to the hardware configuration and the functional configuration of the display unit 3*d* (Step S207).

Meanwhile, when the both data are the same as each other (no change in the coordinate information) (NO at Step S206), the screen-change determination unit 55 determines that there is no change in the display screen due to the input operation and a new display screen due to the change of the screen does not need to be generated, and ends the process in FIG. 15.

Subsequent procedure from Steps S208 to S211 is the same as that from Steps S107 to S110 explained with reference to FIG. 14, and thus explanation thereof is omitted.

(B-2) At the Time of Key Input

Figure 16:
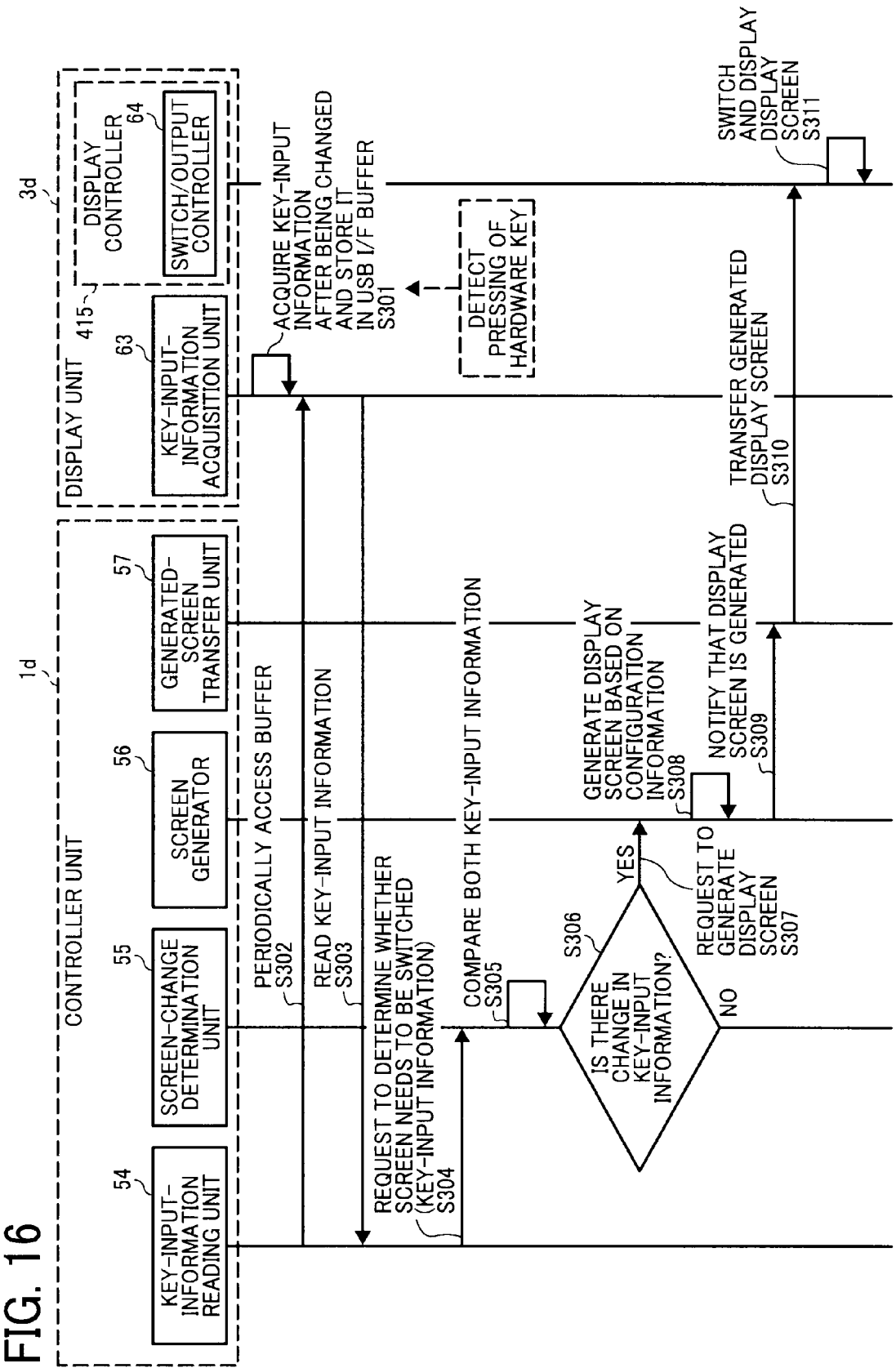
FIG. 16 is a sequence diagram of an example of a procedure for screen display at the time of a key input.

FIG. 16 is a sequence diagram of an example of a procedure for screen display at the time of a key input according to the third embodiment.

In the image forming apparatus 1200, first, when the key input unit 34 of the display unit 3*d* receives a key input (pressing of hardware keys), the key-input-information acquisition unit 63 acquires key-input information based on the output data corresponding to the received key input, and writes the acquired input information to the transmission/reception buffer of the USB I/F 414 (stores the key-input information in the buffer) (Step S301). At this time, the key-input-information acquisition unit 63 converts the data, output from the key input unit 34 to the input-output controller 416, to key input data, and writes the data in the buffer.

More specifically, numeric numbers are previously assigned to keys in a numeric keypad (not shown) as the key input unit 34 for each type of the display unit 3*d*, and the key-input-information acquisition unit 63 can acquire input information based on the keys in the numeric keypad pressed by the user. For example, a wide video graphics array (WVGA) operation is assigned to "1" in the numeric keypad and a half VGA (HVGA) operation is assigned to "2" in the numeric keypad.

When the numeric keypad is used to acquire the input information, the display controller 415 of the display unit 3*d* displays Type No. on the display panel 32 when power supply is initially turned on if the display unit 3*d* is installed in the image forming apparatus 1200. The user (including a manufacturer) presses the numeric keypad according to the displayed information.

Meanwhile, in the controller unit 1*d*, the key-input-information reading unit 54 periodically accesses the transmission/reception buffer of the USB I/F 414 through the communication channel (Step S302).

The key-input-information reading unit 54 reads the key-input information written to the buffer (Step S303), and requests the screen-change determination unit 55 to determine whether the display screen needs to be changed (be switched) due to the input operation (Step S304). At this time, the key-input-information reading unit 54 transfers the read key-input information to the screen-change determination unit 55, and requests the determination therefrom.

The screen-change determination unit 55 compares the key-input information received from the key-input-information reading unit 54 at the time of the previous input operation with the key-input information received at Step S304, and performs the determination (Step S305).

When the both data are different from each other (there is a change in the key-input information) (YES at Step S306), the screen-change determination unit 55 determines that the display screen has been changed due to the input operation and a new display screen after the screen is changed needs to be generated, and requests the screen generator 56 to generate a display screen according to the hardware configuration and the functional configuration of the display unit 3*d* (Step S307).

Meanwhile, when the both data are the same as each other (no change in the key-input information) (NO at Step S306), the screen-change determination unit 55 determines that there is no change in the display screen due to the input operation and a new display screen due to the change of the screen does not need to be generated, and ends the process in FIG. 16.

Subsequent procedure from Steps S308 to S311 is the same as that from Steps S107 to S110 explained with reference to FIG. 14, and thus explanation thereof is omitted.

As explained above, in the controller unit 1*d* side of the image forming apparatus 1200, the function units operated by the controller unit 1*d* are configured to determine whether the display screen needs to be changed (switched) according to the input operation from the user received through the touch panel unit 35 and/or through the key input unit 34 being the input devices provided in the display unit 3*d* (based on the coordinate information obtained through the touch panel unit 35 and the key-input information obtained through the key input unit 34), and to generate, when it is determined that the display screen needs to be changed, the display screen according to the device specifications of the display unit 3*d* based on the configuration information acquired from the connected display unit 3*d*. Meanwhile, in the display unit 3*d* side, the function units operated by the display unit 3*d* are configured to display the display screen generated by the controller unit 1*d* and change the screen (switch the display screen).

As explained above, the image forming apparatus 1200 according to the third embodiment causes the controller unit 1*d* to acquire the configuration information from the connected display unit 3*d* when the display unit 3*d* is changed by the request from the user, and to generate the display screen according to the device specifications of the display unit 3*d* based on the acquired configuration information. The generated display screen is transferred to the display unit 3*d* through the communication channel established at the time of the connection, and the display unit 3*d* shows the display screen generated by the controller unit 1*d*.

After the display unit 3*d* is connected thereto, the controller unit 1*d* determines whether the display screen needs to be changed (switched) according to the input operation from the user received through the touch panel unit 35 and/or through the key input unit 34 of the display unit 3*d*. When it is determined that the display screen needs to be changed, the controller unit 1*d* generates the display screen according to the device specifications of the display unit 3*d* based on the configuration information acquired from the connected display unit 3*d*. As a result, the display unit 3*d* shows the display screen generated by the controller unit 1*d* and changes the screen (switches the display screen).

Thus, the image forming apparatus 1200 can perform display control capable of flexibly handling the hardware configuration and the functional configuration of the display unit 3*d* changed in response to the request of the user.

Accordingly, the user can freely replace the display unit 3*d* being an operation unit of the image forming apparatus 1200, and the image forming apparatus 1200 can provide the UI environment excellent in operability and convenience to the users.

The "display control function" of the image forming apparatus 1200 according to the third embodiment can be implemented by encoding the procedures explained with reference to the figures in a programming language to obtain a program and causing the controller unit 1*d* and the display unit 3*d* to execute the program. Therefore, the program can be stored in a computer-readable recording medium (not shown).

Thus, the program is stored in various recording media such as a Floppy™ disk, a compact disk (CD), a digital versatile disk (DVD), and a semiconductor memory, to thereby install the program in the image forming apparatus 1200 and the display unit 3*d* through a drive unit (not shown) that can read these recording media. When the image forming apparatus 1200 is provided with a data communication I/F (not shown) capable of being connected to a data transmission line such as a network, an electric communication line such as the Internet is used, so that the program can be downloaded and installed therein.

In the third embodiment, as the hardware configuration of the display unit 3*d*, the example of providing the touch panel unit 35 and the key input unit 34 is explained, however, these two components are not always necessary for the display unit 3*d*. Therefore, to receive an input operation from the user, only either one of the components may be provided therein.

Thus, the display control function explained so far in the third embodiment does not necessarily include the function units such as the coordinate-information reading unit 53, the key-input-information reading unit 54, the coordinate-information acquisition unit 62, and the key-input-information acquisition unit 63. In the configuration of the display control function, the functional configuration corresponding to the display unit 3*d* that includes the touch panel unit 35 and the key input unit 34 is explained as an example. However, these function units can be formed with other function units in combination of the coordinate-information reading unit 53 and the coordinate-information acquisition unit 62, or in combination of the key-input-information reading unit 54 and the key-input-information acquisition unit 63, according to the hardware configuration and the functional configuration of the display unit 3d to be installed.

The display control function is explained in the third embodiment using the operation example of generating and displaying the display screen according to the screen size of the display unit 3d, however, the present invention is not limited to this content. The display control function according to the third embodiment allows display control according to various hardware configurations and functional configurations such as display color specifications.

The display control function is explained in the third embodiment using the operation example of acquiring the configuration information from the display unit 3d connected to the image forming apparatus 1200, however, the present invention is not limited to this content. For example, the image forming apparatus 1200 may be configured to acquire identification information for uniquely identifying the display unit 3d. Therefore, the characteristics of the hardware and the functions of the installed display unit 3d can simply be determined in the image forming apparatus 1200 side.

Lastly, the present invention is not limited to the requirements shown here in which some other devices are combined to the shapes and the configurations explained in the third embodiment. It should be noted that these points can be changed within a scope not departing from the spirit of the present invention, and can be appropriately specified according to an application form.

In the third embodiment, the image forming apparatus according to the present invention is explained using a example of being applied to a multifunction product having at least two functions among a copier function, a printer function, a scanner function, and a facsimile function. However, the present invention can be applied to any one of the image forming apparatuses such as a copier, a printer, a scanner device, and a facsimile device.

As described above, according to one aspect of the present invention, the operation screen can be flexibly generated while an increase in the volume of previously generated basic images (screen configuration data) is suppressed. Thus, it is possible to achieve a flexibly configured image forming apparatus capable of generating operation screens of various sizes in the display unit side so that the image forming apparatus is not affected by the size of the display panel.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a controller unit that executes various processes to form an image;
a display unit that includes a display and displays an operation screen for receiving an operation instruction of the processes from a user on the display; and
a generation unit that generates the operation screen, wherein
the controller unit includes
a storage unit that stores therein screen configuration data including information on a display element that forms the operation screen and information on coordinates representing a display position of the display element on a basic display screen,
a determination unit that detects a change of a configuration of the image forming apparatus and determines whether the operation screen needs to be updated based on a content of the detected change,
a screen-configuration-data acquisition unit that acquires, when it is determined that an update of the operation screen is needed, screen configuration data corresponding to an operation screen after the update from the storage unit, and
a first communication unit that transmits the acquired screen configuration data to the display unit,
the display unit includes
a display controller that displays a first operation screen that is an operation screen before the update on the display, and
a second communication unit that receives the screen configuration data from the first communication unit,
the generation unit determines whether display text is included in the received screen configuration data, sends, via the second communication unit, a request for acquisition of character font data corresponding to the display text, in response to determining that display text is included in the received screen configuration data, and generates second operation screen data that is screen configuration data for a second operation screen based on the received screen configuration data and configuration information related to the display unit,
the display controller updates the first operation screen to the second operation screen based on the second operation screen data, and
the generating unit converts the coordinates representing the display position of the display element on the basic display screen into coordinates representing a display position of the display element on the display depending on ratio of vertical size and ratio of horizontal size between the basic display screen and the display to generate the second operation screen data.

2. The image forming apparatus according to claim 1, wherein the determination unit determines that the operation screen needs to be updated when an operational state of the image forming apparatus is changed.

3. The image forming apparatus according to claim 1, wherein the generation unit enlarges the basic display screen when a size of the display is larger than a size of the basic display screen.

4. The image forming apparatus according to claim 1, wherein the generation unit reduces the basic display screen when the size of the display is smaller than the size of the basic display screen.

5. The image forming apparatus according to claim 1, wherein the generation unit generates the second operation screen data using character font data received from outside of the controller unit and the display unit.

6. The image forming apparatus according to claim 5, wherein
the controller unit further includes a connection interface of a recording medium,
the first communication unit includes a character-font-data acquisition unit that receives the request for acquisition of character font data from the display unit, and acquires the character font data corresponding to the display text from the recording medium connected to the connection interface upon receiving the request, and
the first communication unit transmits the acquired character font data corresponding to the display text to the display unit.

7. The image forming apparatus according to claim 5, wherein
the controller unit further includes a communication unit for connecting to a network, and
a character-font-data acquisition unit acquires the character font data used by the display unit from a character font server connected to the network.

8. The image forming apparatus according to claim 1, wherein the display unit includes the generation unit.

9. The image forming apparatus according to claim 1, wherein the controller unit includes the generation unit.

10. The image forming apparatus according to claim 9, wherein
the display unit further includes
a first storage unit that stores therein the configuration information, and
an input unit that receives input information from the user,
the controller unit further includes an input-information reading unit that reads received input information,
the determination unit determines whether the first operation screen needs to be updated based on read input information,
the generation unit generates the second operation screen data based on read configuration information,
the first communication unit transmits generated second operation screen data to the display unit,
the second communication unit receives the second operation screen data, and
the display controller updates the first operation screen to the second operation screen based on the second operation screen data.

11. The image forming apparatus according to claim 10, wherein
the controller unit further includes a second storage unit that stores therein the input information,
the input-information reading unit sequentially reads the input information and stores therein read input information in the second storage unit, and
the determination unit compares the input information read at a predetermined time point with previously read input information stored in the second storage unit, and determines whether the first operation screen needs to be updated based on a result of the comparison.

12. The image forming apparatus according to claim 10, wherein the input unit is a touch panel and includes a coordinate-information acquisition unit that converts the input information received from the touch panel to coordinate information indicating a position of a touch input on the touch panel.

13. The image forming apparatus according to claim 10, wherein the input unit is an input key associated with a predetermined request operation and includes a key-input-information acquisition unit that converts the input information received from the input key to key-input information indicating a request operation associated with the input key.

14. The image forming apparatus according to claim 13, wherein the input key is a numeric keypad.

15. A method of updating an operation screen in an image forming apparatus that includes a controller unit that executes various processes to form an image, a display unit that includes a display and displays an operation screen for receiving an operation instruction of the processes from a user on the display, a generation unit that generates the operation screen, and a storage unit that stores therein screen configuration data including information on a display element that forms the operation screen and information on coordinates representing a display position of the display element on a basic display screen, the method comprising:
determining including a determination unit of the controller unit detecting a change of a configuration of the image forming apparatus and determining whether the operation screen needs to be updated based on a content of the detected change;
acquiring including a screen-configuration-data acquisition unit of the controller unit acquiring, when it is determined that an update of the operation screen is needed, screen configuration data corresponding to an operation screen after the update from the storage unit;
first communicating including a first communication unit of the controller unit transmitting the acquired screen configuration data to the display unit;
display controlling including a display controller of the display unit displaying a first operation screen that is an operation screen before the update on the display;
second communicating including a second communication unit of the display unit receiving the screen configuration data from the first communication unit;
generating including the generation unit determining whether display text is included in the received screen configuration data, sending, via the second communication unit, a request for acquisition of character font data corresponding to the display text, in response to determining that display text is included in the received screen configuration data, and generating second operation screen data that is screen configuration data for a second operation screen based on the received screen configuration data and configuration information related to the display unit; and
updating including the display controller updating the first operation screen to the second operation screen based on the second operation screen data, wherein
the generating converts the coordinates representing the display position of the display element on the basic display screen into coordinates representing a display position of the display element on the display depending on ratio of vertical size and ratio of horizontal size between the basic display screen and the display to generate the second operation screen data.

16. A non-transitory computer-readable storage medium including computer executable instructions, wherein the instructions, when executed by a computer, cause the computer to perform a method of updating an operation screen in an image forming apparatus that includes a controller unit that executes various processes to form an image, a display unit that includes a display and displays an operation screen for receiving an operation instruction of the processes from a user on the display, a generation unit that generates the operation screen, and a storage unit that stores therein screen configuration data including information on a display element that forms the operation screen and information on coordinates representing a display position of the display element on a basic display screen, the method comprising:
determining including a determination unit of the controller unit detecting a change of a configuration of the image forming apparatus and determining whether the operation screen needs to be updated based on a content of the detected change;
acquiring including a screen-configuration-data acquisition unit of the controller unit acquiring, when it is determined that an update of the operation screen is needed, screen configuration data corresponding to an operation screen after the update from the storage unit;

first communicating including a first communication unit of the controller unit transmitting the acquired screen configuration data to the display unit;

display controlling including a display controller of the display unit displaying a first operation screen that is an operation screen before the update on the display;

second communicating including a second communication unit of the display unit receiving the screen configuration data from the first communication unit;

generating including the generation unit determining whether display text is included in the received screen configuration data, sending, via the second communication unit, a request for acquisition of character font data corresponding to the display text, in response to determining that display text is included in the received screen configuration data, and generating second operation screen data that is screen configuration data for a second operation screen based on the received screen configuration data and configuration information related to the display unit; and updating including the display controller updating the first operation screen to the second operation screen based on the second operation screen data, wherein the generating converts the coordinates representing the display position of the display element on the basic display screen into coordinates representing a display position of the display element on the display depending on ratio of vertical size and ratio of horizontal size between the basic display screen and the display to generate the second operation screen data.

17. The image forming apparatus according to claim 1, wherein the first communication unit includes a character-font-data acquisition unit that receives the request for acquisition of character font data from the display unit, determines whether the character font data corresponding to the display text is stored in a storage medium that is external to the image forming apparatus, and acquires the character font data corresponding to the display text from the storage medium, in response to the character font data corresponding to the display text being stored in the storage medium, the first communication unit transmits the acquired character font data corresponding to the display text to the display unit, and the generation unit generates the second operation screen data using the acquired character font data corresponding to the display text.

* * * * *